US012266856B2

(12) United States Patent
Jeon et al.

(10) Patent No.: US 12,266,856 B2
(45) Date of Patent: Apr. 1, 2025

(54) ELECTRONIC DEVICE INCLUDING ANTENNA

(71) Applicant: SAMSUNG ELECTRONICS CO., LTD., Suwon-si (KR)

(72) Inventors: Jaewoong Jeon, Suwon-si (KR); Yonghyun Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 206 days.

(21) Appl. No.: 17/879,609

(22) Filed: Aug. 2, 2022

(65) Prior Publication Data

US 2023/0013109 A1 Jan. 19, 2023

Related U.S. Application Data

(63) Continuation of application No. PCT/KR2022/008282, filed on Jun. 13, 2022.

(30) Foreign Application Priority Data

Jul. 12, 2021 (KR) ........................ 10-2021-0090857

(51) Int. Cl.
*H01Q 13/18* (2006.01)
*H01Q 1/24* (2006.01)
*H01Q 1/52* (2006.01)

(52) U.S. Cl.
CPC ............. *H01Q 13/18* (2013.01); *H01Q 1/241* (2013.01); *H01Q 1/526* (2013.01)

(58) Field of Classification Search
CPC ........ H01Q 13/18; H01Q 1/241; H01Q 1/526; H01Q 1/243; H01Q 13/103; H01Q 13/10; H01Q 13/16; H01Q 13/106
See application file for complete search history.

(56) References Cited

U.S. PATENT DOCUMENTS 5,489,913 A * 2/1996 Raguenet ............... H01Q 13/18 343/770
6,043,786 A * 3/2000 Vannatta ................ H01Q 5/357 343/770
(Continued)

FOREIGN PATENT DOCUMENTS

CN 1881689 A * 12/2006
CN 201805002 U * 4/2011
(Continued)

OTHER PUBLICATIONS

Search Report dated Sep. 16, 2022 issued in International Patent Application No. PCT/KR2022/008282.

*Primary Examiner* — Ricardo I Magallanes
*Assistant Examiner* — Jordan E. DeWitt
(74) *Attorney, Agent, or Firm* — Nixon & Vanderhye P.C.

(57) ABSTRACT

According to an example embodiment, an electronic device includes: a housing including a front surface, a rear surface opposite to the front surface, and a side surface surrounding at least a portion of an internal space between the front surface and the rear surface, the side surface comprising a conductive material; a wireless communication circuit disposed in the internal space, and an antenna structure including an antenna electrically connected to the wireless communication circuit. The antenna structure includes, an antenna slit formed in an area of the side surface comprising the conductive material and having a longitudinal direction, a feeder configured to apply a current to the antenna slit, and a conductive member comprising a conductive material connected to the side surface to cover at least a portion of the antenna slit.

9 Claims, 17 Drawing Sheets

(56) References Cited

U.S. PATENT DOCUMENTS 6,664,931 B1 * 12/2003 Nguyen ................. H01Q 1/243 343/700 MS
6,864,848 B2 * 3/2005 Sievenpiper ............. H01Q 9/14 343/768
6,919,853 B2 * 7/2005 Jordan ................... H01Q 21/30 343/770
7,256,739 B2 * 8/2007 Usami ...................... H01Q 1/22 343/720
7,623,083 B2 * 11/2009 Chung ................... H01Q 13/10 343/749
7,710,273 B2 * 5/2010 Smith .................... H01Q 21/30 343/700 R
9,070,985 B2 * 6/2015 Wang ..................... H01Q 21/28
9,640,871 B2 * 5/2017 Cho ..................... H01Q 13/106
9,793,641 B1 * 10/2017 Eiden ................... H01R 13/453
10,103,445 B1 * 10/2018 Gregoire ................ H01Q 21/08
10,283,868 B1 * 5/2019 Breed .................. H01Q 9/0442
10,454,173 B2 * 10/2019 Taachouche ......... H01Q 9/0464
10,498,041 B1 * 12/2019 Lin ........................ H01Q 13/16
10,950,932 B1 * 3/2021 Ruaro ...................... H01Q 1/48
2005/0052329 A1 * 3/2005 Tsukamoto ............ H01Q 1/243 343/702
2005/0088354 A1 * 4/2005 Chang ...................... H01Q 1/38 343/767
2005/0104793 A1 * 5/2005 Yuanzhu ................ H01Q 13/10 343/770
2006/0125703 A1 * 6/2006 Ma ....................... H01Q 13/103 343/746
2009/0073065 A1 * 3/2009 Jordan ................. H01Q 13/106 343/767
2010/0103062 A1 * 4/2010 Chang .................... H01Q 13/10 343/767
2010/0181379 A1 * 7/2010 Okegawa ......... G06K 19/07749 235/492
2013/0088400 A1 * 4/2013 Chen ...................... H01Q 1/521 343/770
2014/0071009 A1 * 3/2014 Cheng .................... H01Q 5/378 343/770
2014/0198006 A1 * 7/2014 Nakano .................... H01Q 7/06 343/788
2014/0347242 A1 * 11/2014 Seo .......................... H01Q 1/48 343/848
2014/0361943 A1 * 12/2014 Chang .................... H01Q 5/342 343/767
2015/0109567 A1 * 4/2015 Tago ................. G02F 1/134336 349/138
2015/0311595 A1 * 10/2015 Park ......................... H01Q 1/48 343/702
2016/0006110 A1 * 1/2016 Jain .......................... H01Q 1/36 343/702
2016/0049734 A1 * 2/2016 Kim ..................... H01Q 9/0421 343/702
2016/0064812 A1 * 3/2016 Han ......................... H01Q 9/42 343/702
2016/0118710 A1 * 4/2016 Shin ....................... H01Q 1/241 343/702
2017/0244171 A1 * 8/2017 Lee ........................ H01Q 5/357
2017/0346163 A1 * 11/2017 Lee .......................... H04B 5/26
2017/0346164 A1 * 11/2017 Kim .................... H04M 1/0266
2018/0049313 A1 * 2/2018 Liu .......................... H01Q 5/50
2018/0294576 A1 * 10/2018 Niakan ................ H01Q 1/2258
2018/0342789 A1 * 11/2018 Jiang ...................... H01Q 1/528
2018/0375183 A1 * 12/2018 Goto ......................... H01P 3/06
2019/0007120 A1 * 1/2019 Hu ....................... H01Q 9/0421
2019/0288392 A1 * 9/2019 Kim ..................... H05K 5/0226
2020/0014119 A1 * 1/2020 Kim ....................... H01Q 1/523
2020/0099138 A1 * 3/2020 Garrido Lopez .... H01Q 9/0407
2020/0127388 A1 * 4/2020 Hsiao ..................... H01Q 21/20
2020/0136268 A1 * 4/2020 Saeidi .................... H01Q 1/243
2020/0203842 A1 * 6/2020 Chen .................... H01Q 1/2266
2020/0259258 A1 * 8/2020 Amiri .................... H01Q 5/378
2021/0037126 A1 * 2/2021 Yoo ..................... H04M 1/0202
2021/0075090 A1 * 3/2021 Yarga ..................... H01Q 1/241
2021/0376449 A1 * 12/2021 Park ..................... H01Q 13/106
2021/0399429 A1 * 12/2021 Garrido Lopez ........ H01Q 1/44
2022/0102867 A1 * 3/2022 Irci ........................ H01Q 13/10
2022/0231403 A1 * 7/2022 Hong ....................... H01Q 9/04
2023/0013109 A1 * 1/2023 Jeon ....................... H01Q 13/18
2023/0268659 A1 * 8/2023 Kawai .................... H01Q 13/10 343/713
2023/0387584 A1 * 11/2023 Ravichandran .......... H01Q 1/48

FOREIGN PATENT DOCUMENTS

CN 101662067 B * 9/2012
CN 101740856 B * 9/2013
CN 203859225 U * 10/2014
CN 106450767 A * 2/2017
CN 108258398 A * 7/2018
CN 113054409 A * 6/2021 ............... H01Q 1/36
JP 2008147750 A * 6/2008
JP 2012-044688 3/2012
JP 2012044688 A * 3/2012
JP 5403637 1/2014
JP 2015-159388 9/2015
KR 10-0175487 4/1999
KR 10-2007-0054989 5/2007
KR 10-0742098 7/2007
KR 20130123324 11/2013
KR 10-2014-0060404 5/2014
KR 10-1480607 1/2015
KR 10-2016-0003482 1/2016
KR 2017-0031217 3/2017
KR 10-1863013 5/2018
KR 10-2020-0081760 7/2020
KR 10-2142595 8/2020
KR 10-2021-0004754 1/2021
WO WO-2016198914 A1 * 12/2016 ....... G06K 19/07773

* cited by examiner

ELECTRONIC DEVICE INCLUDING ANTENNA

CROSS-REFERENCE TO RELATED APPLICATIONS

This application is a continuation of International Application No. PCT/KR2022/008282 designating the United States, filed on Jun. 13, 2022, in the Korean Intellectual Property Receiving Office and claiming priority to Korean Patent Application No. 10-2021-0090857 filed on Jul. 12, 2021, in the Korean Intellectual Property Office, the disclosures of which are incorporated by reference herein in their entireties.

BACKGROUND

1. Field

The disclosure relates to an electronic device including an antenna.

2. Description of Related Art

An antenna configured to transmit and receive a signal in a preset frequency range may be provided in an electronic device supporting wireless communication. For a small electronic device such as a smartphone, an antenna structure using a metal portion forming an exterior may be provided. To provide such an antenna structure, various types of antennas, for example, a loop antenna, an inverted-F antenna (IFA), a mono antenna, and a slit antenna, may be used. A recent increase in frequency band has required a single electronic device to transmit and receive a signal corresponding to various frequencies, which may require an antenna provided using various metal portions of the electronic device. For an antenna formed on a side surface of an electronic device, the antenna may be provided in a type of a slit antenna in consideration of the strength of the electronic device and an electrical connection to other components.

An electronic device such as a smartphone and a tablet personal computer (PC) may include an antenna structure for transmitting and receiving a frequency in a preset range. Although a manufacturer produces and sells electronic devices of a uniform specification, a required frequency for an electronic device may vary according to a country and a region where the electronic device is to be used and to a manufacturer supporting wireless communication for the electronic device. In general, for an electronic device in which an antenna structure is applied to a metal housing, there may be a basic antenna specification applicable to various required frequencies. To use the electronic device, a plurality of antennas may need to be matched to a required frequency according to a state of use (e.g., a country, a business entity, etc.), or a resonant length of an antenna may need to be tuned in connection with auxiliary materials. However, through this, it may not be easy to implement an antenna having an optimal resonant length for various required frequencies and to tune the resonant length of the antenna according to a requirement. Thus, there is a desire for an antenna structure that may be generally used and be tuned to have a resonant length matched to various required frequencies.

SUMMARY

Embodiments of the disclosure provide an electronic device in which a resonant length of an antenna slit matched to a required frequency may be secured through adjustment of a position of a conductive member with respect to an antenna slit formed in a metal portion of a housing.

Embodiments of the disclosure provide an electronic device in which a resonant length of an antenna slit having a set specification may be simply set and matched to a required frequency, which may increase general applicability.

However, technical aspects of the present disclosure are not limited to the foregoing aspects, and other technical aspects may also be present. Additional aspects of the disclosure will be set forth in part in the description which follows and, in part, will be apparent from the description, or may be learned by practice of the presented embodiments of the disclosure.

According to an example embodiment, an electronic device may include: a housing including a front surface, a rear surface opposite to the front surface, and a side surface surrounding at least a portion of an internal space between the front surface and the rear surface, the side surface comprises a conductive material, a wireless communication circuit disposed in the internal space; and an antenna structure comprising an antenna electrically connected to the wireless communication circuit. The antenna structure may include: an antenna slit formed in an area of the side surface formed with the conductive material and having a longitudinal direction, a feeder configured to apply a current to the antenna slit, and a conductive member comprising a conductive material connected to the side surface to cover at least a portion of the antenna slit. The antenna slit may include: a first slit area in which the feeder is disposed and a second slit area extending from the first slit area in a longitudinal direction and having a width different from that of the first slit area. A resonant length of the antenna slit may be defined based on an arrangement position of the conductive member with respect to the second slit area.

According to an example embodiment, an electronic device may includes: a wireless communication circuit disposed inside the electronic device, a side portion disposed on at least a portion of a side surface of the electronic device and comprising a conductive material, and an antenna structure comprising an antenna formed on the side portion and electrically connected to the wireless communication circuit. The antenna structure may include: an antenna slit including a first slit area formed in the side portion to have a longitudinal direction and having a first width vertical to the longitudinal direction and a second slit area extending from the first slit area in the longitudinal direction and having a second width different from the first width, a feeder disposed in the first slit area; a dielectric disposed in at least a portion of the antenna slit, and a dielectric disposed in a least a portion of the antenna slit, and a conductive member comprising a conductive material disposed to cross a width direction of the second slit area. A resonant length of the antenna slit may be defined by a length from the first slit area to the second slit area in which the conductive member is disposed.

According to various example embodiments described herein, an antenna slit having a longitudinal direction and a conductive member connected to the antenna slit and configured to set a current movement path in the antenna slit may be used to secure general applicability to various frequencies through an antenna slit of a unified specification.

According to various example embodiments described herein, unlike a typical tuning method of connecting a plurality of antennas or connecting an auxiliary material, a single antenna slit may be used to secure a resonant length corresponding to various frequencies, which may increase antenna efficiency.

Other features and aspects will be apparent from the following detailed description, the drawings, and the claims.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
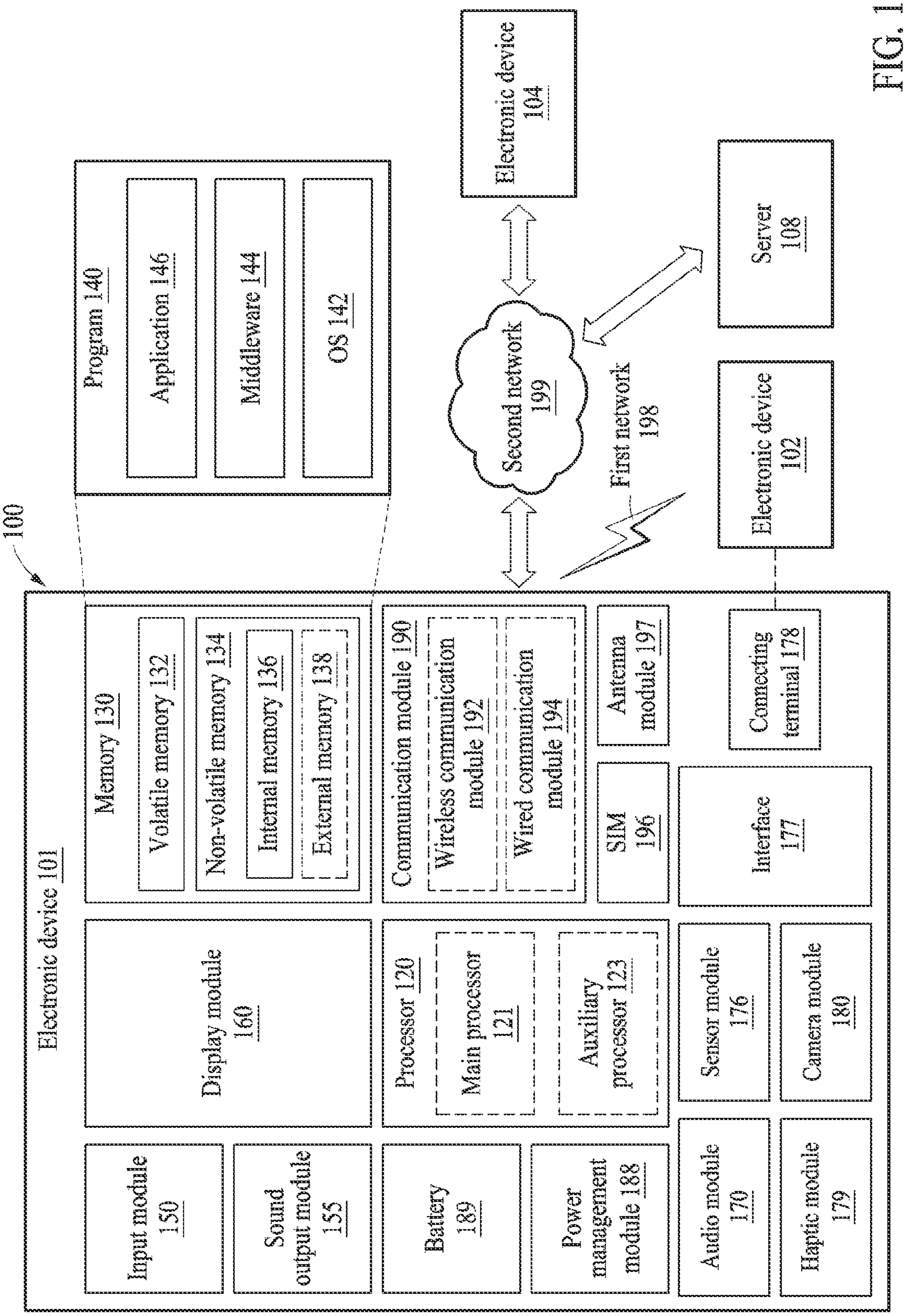
FIG. 1 is a block diagram illustrating an example electronic device in a network environment according to various embodiments.

Hereinafter, various example embodiments will be described in greater detail with reference to the accompanying drawings. When describing the example embodiments with reference to the accompanying drawings, like reference numerals refer to like elements and a repeated description related thereto will be omitted.

FIG. 1 is a block diagram illustrating an example electronic device in a network environment according to various example embodiments. Referring to FIG. 1, an electronic device 101 in a network environment 100 may communicate with an electronic device 102 via a first network 198 (e.g., a short-range wireless communication network), or communicate with at least one of an electronic device 104 and a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various example embodiments, at least one (e.g., the connecting terminal 178) of the above components may be omitted from the electronic device 101, or one or more other components may be added in the electronic device 101. In various example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with, the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor

123. According to an example embodiment, the auxiliary processor 123 (e.g., an NPU) may include a hardware structure specified for artificial intelligence (AI) model processing. An AI model may be generated by machine learning. Such learning may be performed by, for example, the electronic device 101 in which the AI model is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may alternatively or additionally include a software structure other than the hardware structure.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing records. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector, and a control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with an external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel. The communication module 190 may include one or more communication processors that are operable independently of the processor 120 (e.g., an AP) and that support direct (e.g., wired) communication or wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beamforming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated high-frequency band (e.g., the mmWave band), and a plurality of antennas (e.g., array antennas) disposed on a second surface (e.g., a top or a side surface) of the PCB or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general-purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101.

According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least a part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least a part of a reply to the request. To that end, a cloud computing, distributed computing, mobile edge computing (MEC), or client-server computing technology may be used, for example. The electronic device 101 may provide ultra-low latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
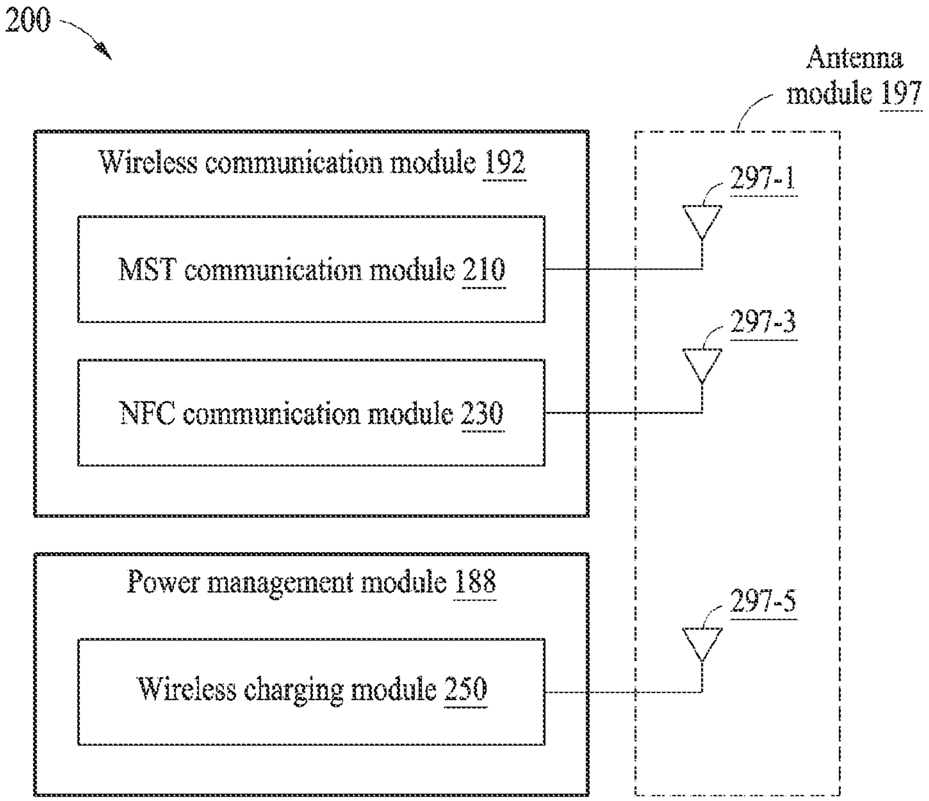
FIG. 2 is a block diagram illustrating an example configuration of an electronic device including a wireless communication module, a power management module, and an antenna module according to various embodiments.

FIG. 2 is a block diagram illustrating an example configuration of an electronic device including a wireless communication module, a power management module, and an antenna module according to an example embodiment. Referring to FIG. 2, a wireless communication module 192 may include a magnetic secure transmission (MST) communication module (e.g., including MST communication circuitry) 210 and/or a near-field communication (NFC) communication module (e.g., including NFC communication circuitry) 230, and a power management module (e.g., including power management circuitry) 188 may include a wireless charging module (e.g., including wireless charging circuitry) 250. In this case, an antenna module 197 may include a plurality of antennas including an MST antenna 297-1 connected to the MST communication module 210, an NFC antenna 297-3 connected to the NFC communication module 230, and a wireless charging antenna 297-5 connected to the wireless charging module 250. For the convenience of description, components already described above with reference to FIG. 1 will not be described again or be briefly described here.

The MST communication module 210 may include various MST communication circuitry and receive a signal including control information or payment information such as card information from the processor 120, and generate a magnetic signal corresponding to the received signal and then transmit the generated magnetic signal to the external electronic device 102 (e.g., a point of sale (POS) device) through the MST antenna 297-1. To generate the magnetic signal, the MST communication module 210 may include a switching module (not shown) including one or more switches connected to the MST antenna 297-1, and control the switching module to change a direction of a voltage or current to be supplied to the MST antenna 297-1 based on the received signal. As the direction of the voltage or current changes, a direction of the magnetic signal (e.g., a magnetic field) to be transmitted through the MST antenna 297-1 may change accordingly. When the magnetic signal of which the direction changes is detected by the external electronic device 102, a similar effect (e.g., a waveform) to a magnetic field generated as a magnetic card corresponding to the received signal (e.g., card information) is swiped over a card reader of the electronic device 102 may be generated. The payment information and control information received in the form of the magnetic signal by the electronic device 102 may be transmitted to the external server 108 (e.g., a payment server) through the network 199, for example.

The NFC communication module 230 may include various NFC communication circuitry and obtain a signal including control information or payment information such as card information from the processor 120, and transmit the obtained signal to the external electronic device 102 through the NFC antenna 297-3. According to an example embodiment, the NFC communication module 230 may receive such a signal transmitted from the external electronic device 102 through the NFC antenna 297-3.

The wireless charging module 250 may include various wireless charging circuitry and wirelessly transmit power to the external electronic device 102 (e.g., a mobile phone or a wearable device) through the wireless charging antenna 297-5, or wirelessly receive power from the external electronic device 102 (e.g., a wireless charging device). The wireless charging module 250 may support one or more of various wireless charging methods including, for example, a magnetic resonance method or a magnetic induction method.

According to an example embodiment, some of the MST antenna 297-1, the NFC antenna 297-3, and the wireless charging antenna 297-5 may share at least a portion of a radiation portion with each other. For example, a radiation portion of the MST antenna 297-1 may be used as a radiation portion of the NFC antenna 297-3 or the wireless charging antenna 297-5, and vice versa. In this example, the antenna module 197 may include a switching circuit (not shown) set to selectively connect (or close) or disconnect (or open) at least a portion of the antennas 297-1, 297-3, and 297-5 under the control of the wireless communication module 192 (e.g., the MST communication module 210 or the NFC communication module 230) or the power management module 188 (e.g., the wireless charging module 250). For example, when the electronic device 101 uses a wireless charging function, the NFC communication module 230 or the wireless charging module 250 may control the switching circuit to temporarily disconnect at least a portion of the radiation portion shared by the NFC antenna 297-3 and the wireless charging antenna 297-5 from the NFC antenna 297-3 and connect it to the wireless charging antenna 297-5.

At least one of functions of the MST communication module 210, the NFC communication module 230, or the wireless charging module 250 may be controlled by a processor (e.g., the processor 120). Preset functions (e.g., a payment function) of the MST communication module 210 or the NFC communication module 230 may be performed in a trusted execution environment (TEE). The TEE may establish an execution environment to which at least some preset areas of the memory 130 are allocated to perform functions (e.g., functions related to financial transaction or personal information) that require a relatively high level of security. In this case, access to the preset areas may be restrictively allowed according to, for example, a subject accessing the areas or an application executed in the TEE.

An electronic device described herein may be a device of various types. The electronic device may include, as non-limiting examples, a portable communication device (e.g., a smartphone, etc.), a computing device, a portable multimedia device, a portable medical device, a camera, a wearable device, a home appliance, or the like. However, the electronic device is not limited to the foregoing examples.

It should be understood that various example embodiments of the present disclosure and the terms used therein are not intended to limit the technological features set forth herein to some particular embodiments but include various changes, equivalents, or replacements of the example embodiments. In connection with the description of the drawings, like reference numerals may be used for similar or related components. It should be understood that a singular form of a noun corresponding to an item may include one or more of the things, unless the relevant context clearly indicates otherwise. As used herein, "A or B," "at least one of A and B," "at least one of A or B," "A, B, or C," "at least one of A, B, and C," and "A, B, or C," each of which may include any one of the items listed together in the corresponding one of the phrases, or all possible combinations thereof. Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure. It should also be understood that, when a component (e.g., a first component) is referred to as being "connected to" or "coupled to" another component with or without the term "functionally" or "communicatively," the component can be connected or coupled to the other component directly (e.g., wiredly), wirelessly, or via a third component.

As used in connection with various example embodiments of the disclosure, the term "module" may include a unit implemented in hardware, software, or firmware, or any combination thereof, and may interchangeably be used with other terms, for example, "logic," "logic block," "part," or "circuitry." A module may be a single integral component, or a minimum unit or part thereof, adapted to perform one or more functions. For example, according to an example embodiment, the module may be implemented in the form of an application-specific integrated circuit (ASIC).

Various example embodiments set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The "non-transitory" storage medium is a tangible device, and may not include a signal (e.g., an electromagnetic wave), but this term does not differentiate between where data is semi-permanently stored in the storage medium and where the data is temporarily stored in the storage medium.

According to various example embodiments, a method according to an example embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components or operations may be omitted, or one or more other components or operations may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 3A:
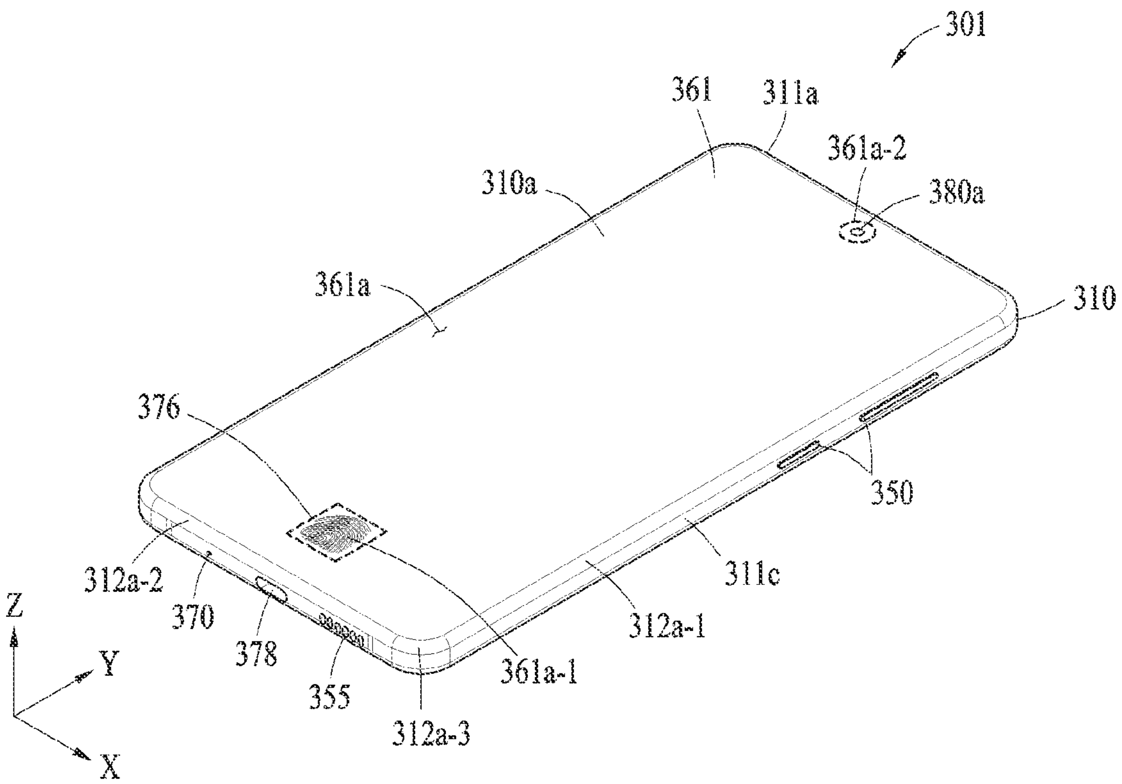
FIG. 3A is a front perspective view of an electronic device according to various embodiments.
Figure 3B:
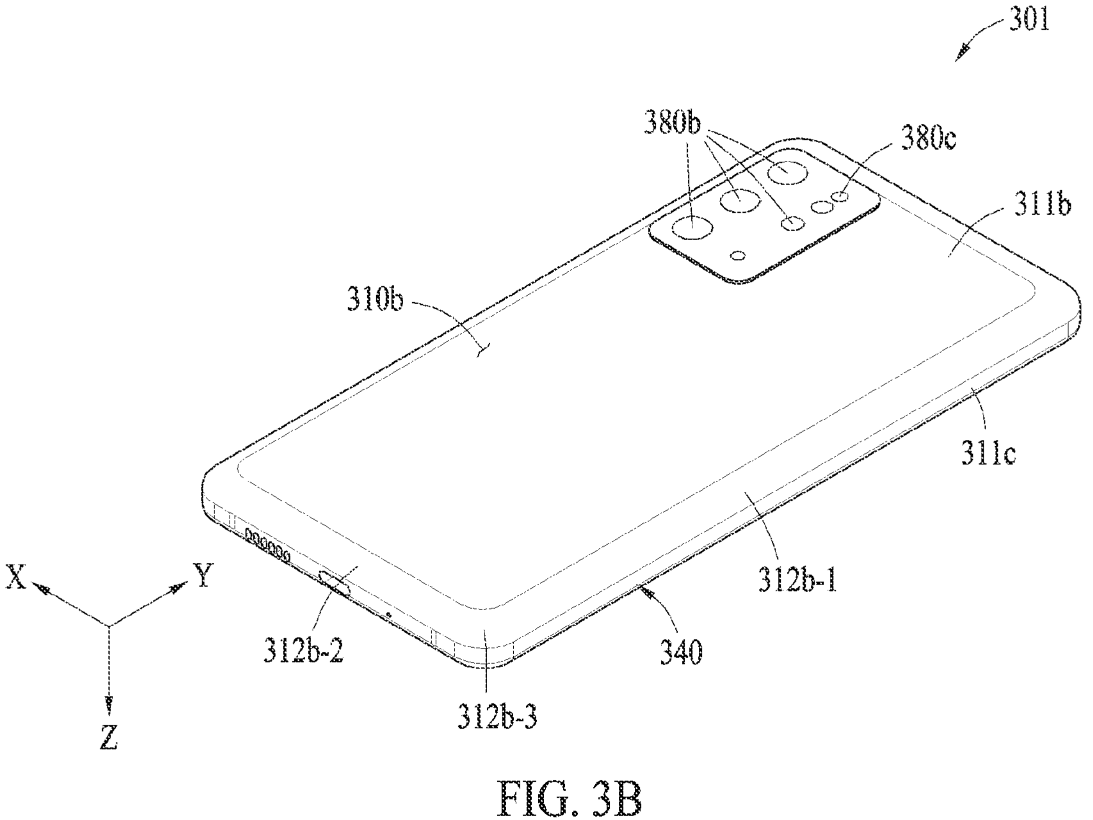
FIG. 3B is a rear perspective view of an electronic device according to various embodiments.
Figure 4:
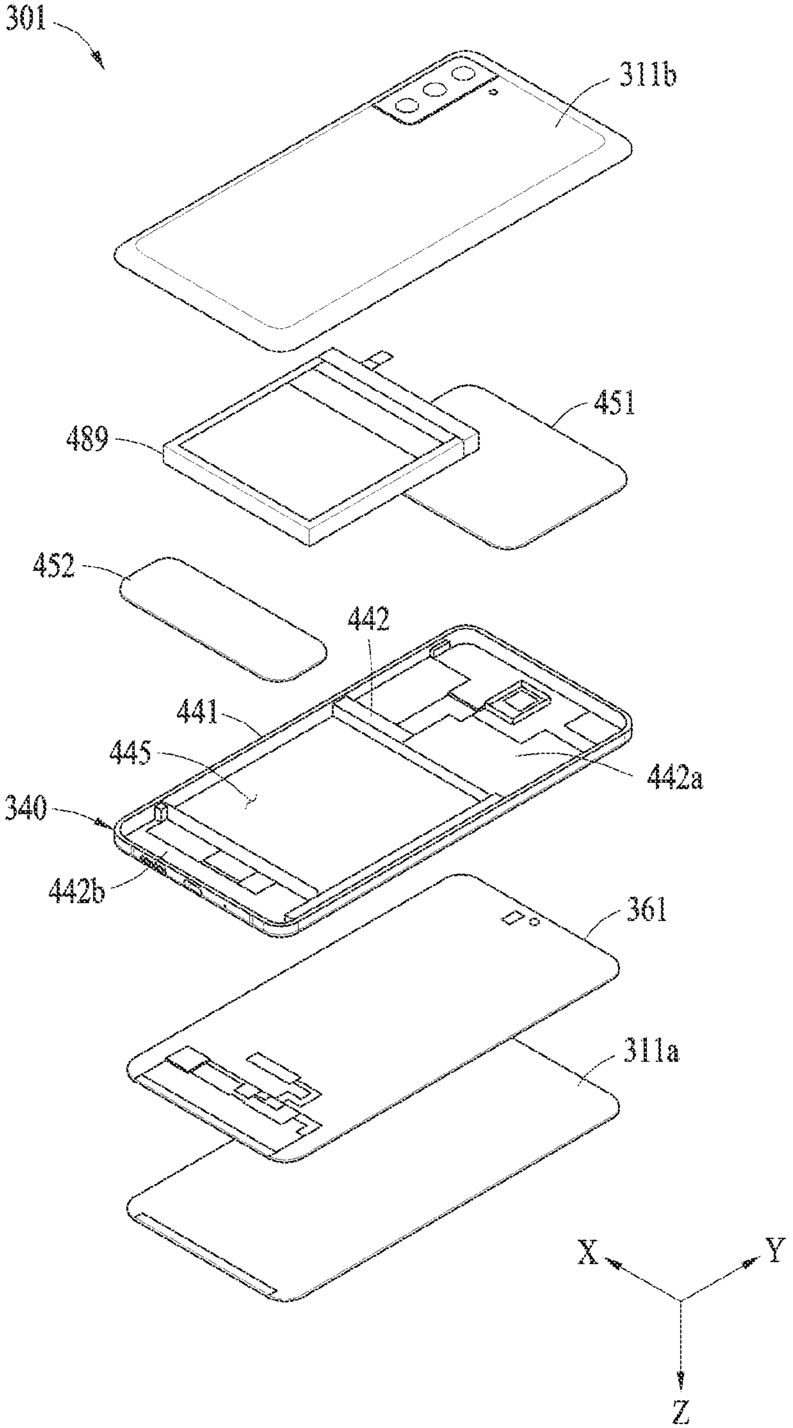
FIG. 4 is an exploded perspective view of an electronic device according to various embodiments.

FIG. 3A is a front perspective view of an electronic device according to various embodiments, and FIG. 3B is a rear perspective view of an electronic device according to various embodiments. FIG. 4 is an exploded perspective view of an electronic device according to various embodiments.

Referring to FIGS. 3A, 3B, and 4, according to an example embodiment, an electronic device 301 (e.g., the electronic device 101 of FIG. 1) may include a housing 310 having a front surface 310*a* (e.g., a first surface), a rear surface 310*b* (e.g., a second surface), and a side surface 311*c* (e.g., a third surface) surrounding an internal space between the front surface 310*a* and the rear surface 310*b*.

The front surface 310*a* may be formed with a first plate 311*a* of which at least a portion is substantially transparent. For example, the first plate 311*a* may include, for example, a glass plate or polymer plate including at least one coated layer. The rear surface 310*b* may be formed with a second plate 311*b* that is substantially opaque. The second plate 311*b* may be formed with, for example, coated or colored glass, ceramics, metal (e.g., aluminum, stainless steel, or magnesium), or a combination thereof. The side surface 311*c* may be connected to the first plate 311*a* and the second plate 311*b* and be formed by a side portion 340 including metal and/or polymer. The second plate 311*b* and the side portion 340 may be integrated seamlessly. The second plate 311*b* and the side portion 340 may be formed with substantially the same material (e.g., aluminum).

The first plate 311*a* may include a plurality of first edge areas 312*a*-1 rounded in a direction from at least an area of the front surface 310*a* toward the second plate 311*b* and extending in one direction (e.g., a +/−X-axis direction), a plurality of second edge areas 312*a*-2 rounded in a direction from at least an area of the front surface 310*a* toward the second plate 311*b* and extending in another direction (e.g., a +/−Y-axis direction), and a plurality of third edge areas 312*a*-3 rounded in a direction from at least an area of the front surface 310*a* toward the second plate 311*b* and disposed between the first edge areas 312*a*-1 and the second edge areas 312*a*-2.

The second plate 311*b* may include a plurality of fourth edge areas 312*b*-1 rounded in a direction from at least an area of the rear surface 310*b* toward the first plate 311*a* and extending in one direction (e.g., a +/−X-axis direction), a plurality of fifth edge areas 312*b*-2 rounded in a direction from at least an area of the rear surface 310*b* toward the first plate 311*a* and extending in another direction (e.g., a +/−Y-axis direction), and a plurality of sixth edge areas 312*b*-3 rounded in a direction from at least an area of the rear surface 310*b* toward the first plate 311*a* and disposed between the fourth edge areas 312*b*-1 and the fifth edge areas 312*b*-2.

The side portion 340 may surround at least a portion of an internal space between the front surface 310*a* and the rear surface 310*b*. The side portion 340 may include a first support structure 441 disposed at least a portion of the side surface 311*c* and a second support structure 442 connected to the first support structure 441 and forming an arrangement space in which components of the electronic device 301 are disposed. The first support structure 441 may form the side surface 311*c* of the housing 310 by connecting an edge of the first plate 311*a* and an edge of the second plate 311*b* and surrounding a space between the first plate 311*a* and the second plate 311*b*. The second support structure 442 may be disposed in an internal portion (or a body portion) of the electronic device 301. The second support structure 442 may be integrated with the first support structure 441, and separately formed to be connected to the first support structure 441. In the second support structure 442, printed circuit boards (PCBs) 451 and 452 may be disposed. For example, the second support structure 442 may be connected to a ground of the PCBs 451 and 452. On one surface (e.g., a lower surface (a surface in a +Z-axis direction) of FIG. 4) of the second support structure 442, a display 361 may be disposed. On another surface (e.g., an upper surface (a surface in a −Z-axis direction) of FIG. 4) of the second support structure 442, the second plate 311*b* may be disposed.

At least a portion of the side portion 340 may be formed with a conductive material. For example, the first support structure 441 may be formed with metal and/or a conductive polymer material. For example, similar to the first support structure 441, the second support structure 442 may be formed with metal and/or a conductive polymer material.

The electronic device 301 may include the display 361 (e.g., the display module 160 of FIG. 1). The display 361 may be disposed on the front surface 310*a*. The display 361 may be visible through at least a portion of the first plate 311*a*, for example, the first edge areas 312*a*-1, the second edge areas 312*a*-2, and the third edge areas 312*a*-3. The display 361 may have a shape substantially the same as that of an outer edge of the first plate 311*a*. According to some example embodiments, an edge of the display 361 may be substantially matched to the outer edge of the first plate 311*a*. The display 361 may include a touch sensing circuit, a pressure sensor configured to sense an intensity (pressure) of a touch, and/or a digitizer configured to sense a magnetic stylus pen.

The display 361 may include a screen displaying area 361*a* visually exposed (as used herein, the terms "visually exposed" and "visible" may be used interchangeably to indicate that the display is viewable with or without a cover present), on which contents are displayed through pixels or cells. The screen displaying area 361*a* may include a sensing area 361*a*-1 and a camera area 361*a*-2. In this case, the sensing area 361*a*-1 may overlap at least a portion of the screen displaying area 361*a*. The sensing area 361*a*-1 may allow transmission of an input signal associated with a sensor module 376 (e.g., the sensor module 176 of FIG. 1). The sensing area 361*a*-1 may display the contents in a similar way the screen displaying area 361*a* that does not overlap the sensing area 361*a*-1 displays the contents. For example, while the sensor module 376 is not operating, the sensing area 361*a*-1 may display the contents. The camera area 361*a*-2 may overlap at least a portion of the screen displaying area 361*a*. The camera area 361*a*-2 may allow transmission of an optical signal associated with camera modules 380*a* and 380*b* (e.g., the camera module 180 of FIG. 1). The camera area 361*a*-2 may display the contents in a similar way the screen displaying area 361*a* that does not overlap the camera area 361*a*-2 displays the contents. For example, while the camera modules 380*a* and 380*b* are not operating, the camera area 361*a*-2 may display the contents.

The electronic device 301 may include an audio module 370 (e.g., the audio module 170 of FIG. 1). The audio module 370 may obtain sound from an outside of the electronic device 301. For example, the audio module 370 may be disposed on the side surface 311*c* of the housing 310. The audio module 370 may obtain sound through at least one hole.

The electronic device 301 may include the sensor module 376. The sensor module 376 may sense a signal applied to the electronic device 301. For example, the sensor module 376 may be disposed on the front surface 310*a* of the electronic device 301. The sensor module 376 may form the sensing area 361*a*-1 on at least a portion of the screen displaying area 361*a*. The sensor module 376 may receive an input signal transmitted through the sensing area 361*a*-1, and generate an electrical signal based on the received input signal. For example, the input signal may have physical quantities (e.g., quantities related to heat, light, temperature, sound, pressure, ultrasound). For another example, the input signal may include a signal associated with bioinformation (e.g., fingerprints and voice) of a user.

The electronic device 301 may include the camera modules 380*a* and 380*b* (e.g., the camera module 180 of FIG. 1). The camera modules 380*a* and 380*b* may include a first camera module 380*a*, a second camera module 380*b*, and a flash 380*c*. The first camera module 380*a* may be disposed to be exposed through the front surface 310*a* of the housing 310, and the second camera module 380*b* and the flash 380*c* may be disposed to be exposed through the rear surface 310*b* of the housing 310. At least a portion of the first camera module 380*a* may be disposed on the housing 310 to be covered by the display 361. The first camera module 380*a* may receive an optical signal transmitted through the camera area 361*a*-2. The second camera module 380*b* may include a plurality of cameras (e.g., a dual-lens camera, a triple-lens camera, or a quad-lens camera). The flash 380*c* may include a light-emitting diode (LED) or a xenon lamp.

The electronic device 301 may include a sound output module 355 (e.g., the sound output module 155 of FIG. 1). The sound output module 355 may output sound to the outside of the electronic device 301. For example, the sound output module 355 may output sound to the outside of the electronic device 301 through at least one hole formed on the side surface 311*c* of the housing 310.

The electronic device 301 may include an input module 350 (e.g., the input module 150 of FIG. 1). The input module 350 may receive a user control signal from the user. For example, the input module 350 may include at least one key input device disposed to be exposed on the side surface 311*c* of the housing 310.

The electronic device 301 may include a connecting terminal 378 (e.g., the connecting terminal 178 of FIG. 1). The connecting terminal 378 may be disposed on the side surface 311*c*. For example, when the electronic device 301 is viewed in one direction (e.g., a +Y-axis direction in FIG. 3A), the connecting terminal 378 may be disposed in a central portion of the side surface 311*c*, and the sound output module 355 may be disposed in one direction (e.g., a right direction) with respect to the connecting terminal 378.

The electronic device 301 may include the PCBs 451 and 452 and a battery 489 (e.g., the battery 189 of FIG. 1). The PCBs 451 and 452 may include a first PCB 451 and a second PCB 452. In this case, the first PCB 451 may be received in a first board slot 442*a* of the second support structure 442, and the second PCB 452 may be received in a second board slot 442*b* of the second support structure 442. The battery 489 may be received in a battery slot 445 of the second support structure 442 that is formed between the first board slot 442*a* and the second board slot 442*b*.

A processor (e.g., the processor 120 of FIG. 1) may be disposed in the PCBs 451 and 452. The processor may include one or more of, for example, a central processing unit (CPU), an application processor (AP), an image signal processor (ISP), a sensor hub processor, and a communication processor. On the PCBs 451 and 452, a wireless communication circuit (e.g., the wireless communication module 192 of FIG. 1) may be disposed. The wireless communication circuit may communicate with an external device (e.g., the electronic device 104 of FIG. 1), for example. The electronic device 301 may include an antenna structure (e.g., the antenna module 197 of FIG. 1 and an antenna structure 50 of FIG. 5), and the wireless communication circuit may be electrically connected to the antenna structure. The wireless communication circuit may generate a signal to be transmitted through the antenna structure and detect a signal received through the antenna structure. The PCBs 451 and 452 may include a ground, and the ground of the PCBs 451 and 452 may function as a ground of the antenna structure implemented using the wireless communication circuit.

Figure 5:
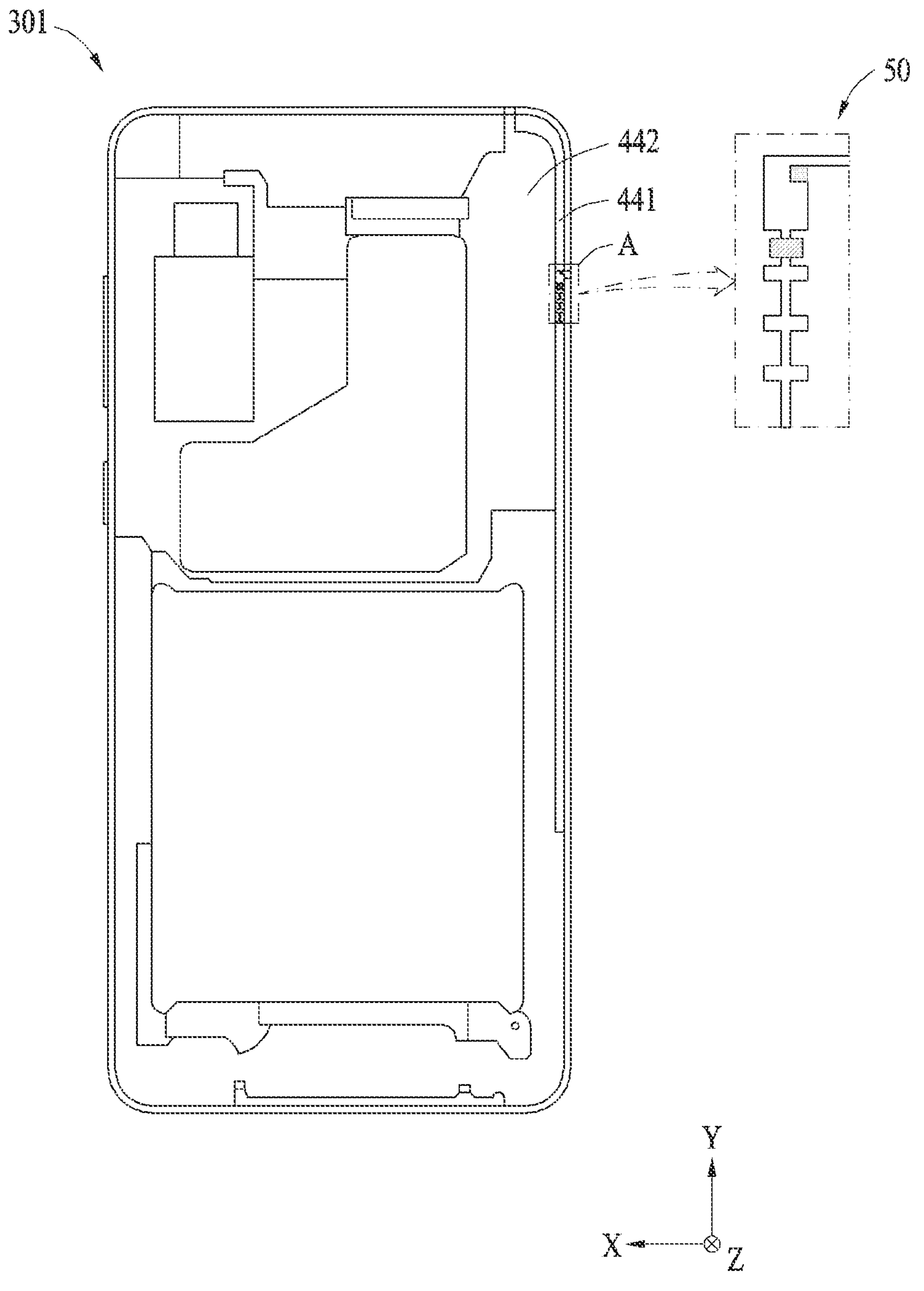
FIG. 5 is a diagram illustrating an example antenna structure formed in an electronic device according to various embodiments.
Figure 6A:
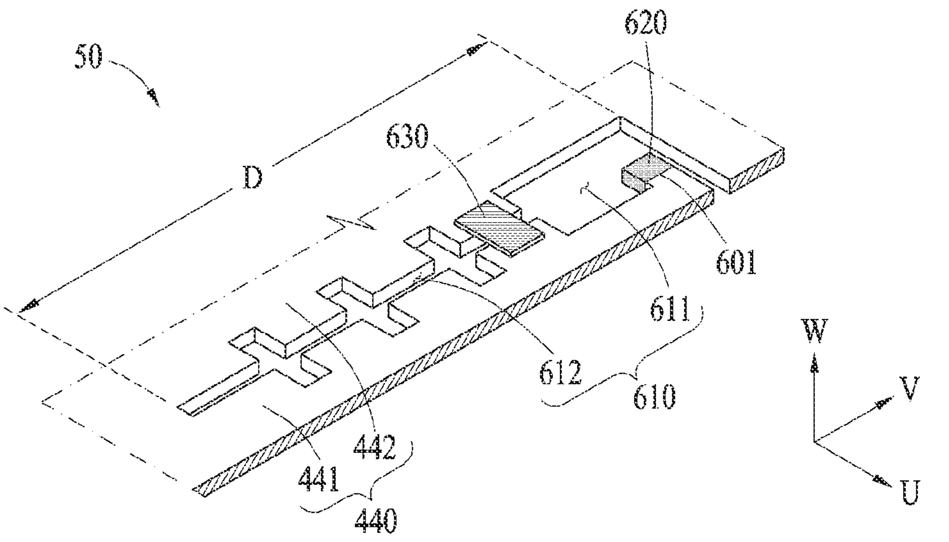
FIG. 6A is an enlarged perspective view of the antenna structure in area A of FIG. 5 according to various embodiments.
Figure 6B:
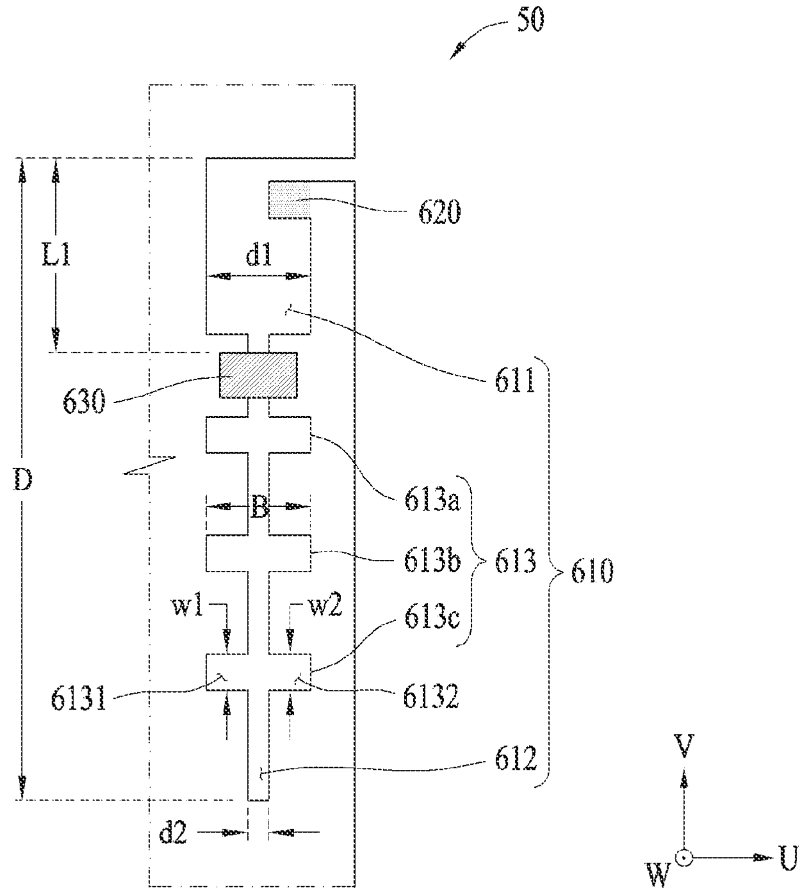
FIG. 6B is an enlarged diagram illustrating the antenna structure in area A of FIG. 5 according to various embodiments.

FIG. 5 is a diagram illustrating an example antenna structure formed in an electronic device according to various embodiments. FIG. 6A is an enlarged perspective view of the antenna structure in area A of FIG. 5 according to various embodiments, and FIG. 6B is an enlarged diagram illustrating the antenna structure in area A of FIG. 5 according to various embodiments.

Referring to FIG. 5, according to an example embodiment, an electronic device 301 may include an antenna structure 50. The antenna structure 50 may be electrically connected to a wireless communication circuit formed on a PCB (e.g., the PCBs 451 and 452 of FIG. 4). The antenna structure 50 may be disposed in at least a portion of a side member (e.g., the side portion 340) forming a side surface of a housing (e.g., the housing 310 of FIG. 3A). In this case, the antenna structure 50 may be formed around an area of the side surface (e.g., side surface 311 of FIG. 3A) formed of a conductive material. For example, the antenna structure 50 may be formed in a type of slit antenna formed through a gap between the first support structure 441 and the second support structure 442 of the side member 340 as illustrated in FIG. 5.

Although the antenna structure 50 may be formed in an edge area on a right side (e.g., a −X-axis direction in FIG. 5) of the side portion 340 as illustrated in FIG. 5, this is provided merely as an example, and the antenna structure 50 may be formed in various areas including, for example, a left edge area, an upper edge area, and a lower edge area of the side member 340. For example, the antenna structure 50 may be formed in a partition wall area around a battery slot (e.g., the battery slot 445 of FIG. 4) formed in the side portion 340. That is, the antenna structure 50 may be formed in various areas of the side portion 340 according to a design requirement.

Such a structure may minimize and/or reduce an internal space of the electronic device 301 occupied by an antenna using a slit antenna structure (e.g., the antenna structure 50) formed on the side member 340. The recent development of communication technology may require an antenna structure corresponding to various wireless communication methods and various frequencies. Since parts or components for operations of buttons or keys and other various parts or components (e.g., an mmWAVE module, a power-related part) are arranged on an outer surface of a side member, a slit antenna may occupy a smaller arrangement space in the side member and enable a design robust against power parts. In addition, an arrangement position of the antenna structure may be re-set according to an arrangement of each part or component of an electronic device (e.g., the electronic device 302) determined based on the design requirement. Hereinafter, the antenna structure 50 formed at an outer edge of the side portion 340 as illustrated in FIG. 5 will be mainly described as an example for the convenience of description.

Referring to FIGS. 6A and 6B, the antenna structure 50 may be formed as a slit antenna. The slit antenna may perform wireless communication by radiating an electromagnetic wave using a slit that forms a gap between two conductors. The antenna structure 50 may include an antenna slit 610, a feeder 620 configured to apply a current to the antenna slit 610, and a conductive member 630 covering at least a portion of the antenna slit 610.

The antenna slit 610 may be formed on a side portion (e.g., the side portion 340 of FIG. 5) to have a longitudinal direction D (e.g., a direction parallel to a V-axis direction of FIG. 6B). For example, the antenna slit 610 may be formed between a first support structure (e.g., the first support structure 441 of FIG. 5) and a second support structure (e.g., the second support structure 442 of FIG. 5). The antenna slit 610 may include a first slit area 611 and a second slit area 612 connected in the longitudinal direction D. In the first slit area 611, the feeder 620 to be described in greater detail below may be disposed. At least a portion of the first slit area 611 may be open to an outside of an electronic device, that is, an outside of a housing. The second slit area 612 may extend in the longitudinal direction D from the first slit area 611, and have a width different from that of the first slit area 611. For example, the first slit area 611 and the second slit area 612 may have different widths based on a width vertical to the longitudinal direction D. For example, the first slit area 611 may have a first width d1 vertical to the longitudinal direction D, and the second slit area 612 may have a second width d2 that is vertical to the longitudinal direction D and less than the first width d1.

The antenna slit 610 may include at least one auxiliary slit 613 formed in the second slit area 612. The auxiliary slit 613 may be formed to form a gap in an extending direction B vertical to the longitudinal direction D and communicate with the second slit area 612. The auxiliary slit 613 may be provided as a plurality of auxiliary slits connected to the second slit area 612, and the auxiliary slits may be formed to be separate from each other along the longitudinal direction D. For example, the antenna slit 610 may include a first auxiliary slit 613*a*, a second auxiliary slit 613*b*, and a third auxiliary slit 613*c* formed to be separate from each other along the longitudinal direction D of the second slit area 612 as illustrated in FIG. 6B. However, the number of auxiliary slits illustrated in FIG. 6B is provided merely as an example, and the number of auxiliary slits is not limited thereto. In addition, although a constant width between the auxiliary slits is illustrated in FIG. 6B, the width is provided merely as an example and the width between the auxiliary slits is not limited thereto. Hereinafter, the antenna slit 610 including the three auxiliary slits 613*a*, 613*b*, and 613*c* separate from each other by the same interval therebetween will be described as an example for the convenience of description.

Figure 9A:
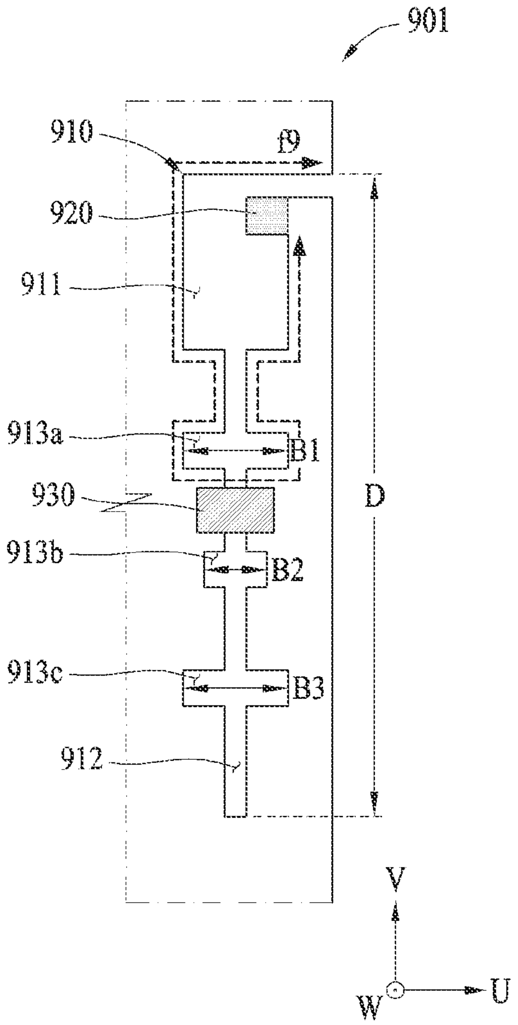
FIGS. 9A and 9B are diagrams illustrating example antenna structures according to various embodiments.

The auxiliary slits 613*a*, 613*b*, and 613*c* separate from each other may perform a function as coordinates for an arrangement of the conductive member 630 to be described in greater detail below. A plurality of auxiliary slits 613 (e.g., the auxiliary slits 613*a*, 613*b*, and 613*c*) may have substantially the same length with respect to the extending direction B as illustrated in FIG. 6B or have different lengths as illustrated in FIG. 9A. In addition, although the auxiliary slits 613 are illustrated in FIG. 6B as having the same width vertical to the extending direction B, the width is provided merely as an example for the convenience of description, and the width of the auxiliary slits 613 is not limited thereto. For example, the auxiliary slits 613 may have substantially the same width or different widths.

Figure 11:
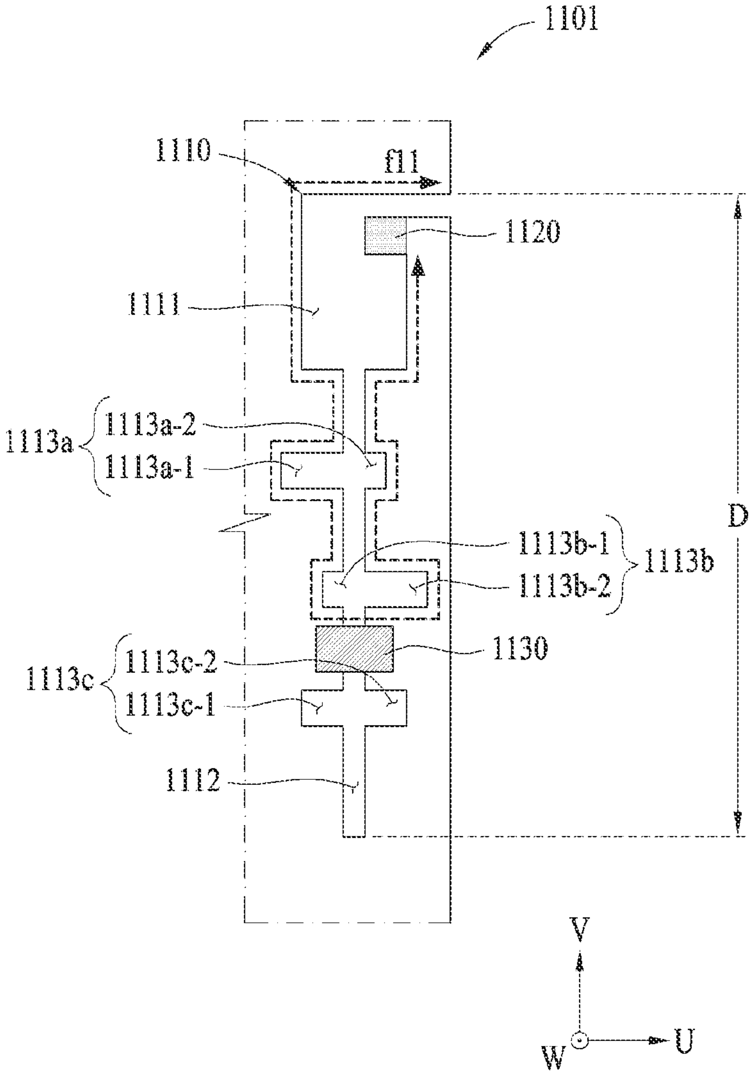
FIG. 11 is a diagram illustrating an example antenna structure according to various embodiments.

An auxiliary slit 613 may include a first auxiliary slit area 6131 and a second auxiliary slit area 6132 formed respectively in both directions of the second slit area 612 along the extending direction B. For example, as illustrated in FIG. 6B, the first auxiliary slit area 6131 may be formed in a left direction (e.g., a −U-axis direction) of the second slit area 612, and the second auxiliary slit area 6132 may be formed in a right direction (e.g., a +U-axis direction) of the second slit area 612. In this example, the auxiliary slit 613 may include both the first auxiliary slit area 6131 and the second auxiliary slit area 6132 having widths w1 and w2, respectively, or only one of the first auxiliary slit area 6131 and the second auxiliary slit area 6132. Based on the single auxiliary slit 613, the first auxiliary slit area 6131 and the second auxiliary slit area 6132 may have substantially the same length in the extending direction B as illustrated in FIG. 6B or different lengths as illustrated in FIG. 11.

The feeder 620 may apply a current to the antenna slit 610. The feeder 620 may be connected to the wireless communication circuit, and apply a current to the antenna slit 610 to radiate an electromagnetic wave for wireless communication. The feeder 620 may be disposed in the first slit area 611 of the antenna slit 610. For example, the antenna slit 610 may include a flange portion 601 protruding inward in the first slit area 611, and the feeder 620 may be disposed in the flange portion 601. The current applied through the feeder 620 may be propagated to the second slit area 612 via the first slit area 611. In this case, as the current applied to the antenna slit 610 moves in the antenna slit 610 along a path via the conductive member 630, an electromagnetic wave radiation pattern corresponding to a resonant length of the antenna slit 610 defined based on a position of the conductive member 630 may be formed, which will be described in detail hereinafter.

The conductive member 630 may set a current movement path through the antenna slit 610 and may thereby define the resonant length formed by the antenna slit 610. The conductive member 630 may be formed of a conductive material, for example, metal (e.g., copper (cu)), and be connected to a side member 440 to cover at least a portion of the antenna slit 610. With the antenna slit 610 viewed as illustrated in FIG. 6B, the conductive member 630 may be connected to the side member 440 to cross a width direction (e.g., a +/−U-axis direction in FIG. 6B) of the second slit area 612. For example, when the antenna slit 610 is formed between the first support structure 441 and the second support structure 442 of the side member 440 (e.g., the side member 340 of FIG. 5), both sides of the conductive member 630 may be respectively connected to the first support structure 441 and the second support structure 442. The conductive member 630 may be attached to the side member 440 through ultrasonic welding.

The current applied to the antenna slit 610 through the feeder 620 may move from the first slit area 611 to the second slit area 612, and then move back to the first slit area 611 via the conductive member 630. Thus, the movement path of the current applied to the antenna slit 610 may be determined based on an arrangement position of the conductive member 630 in the second slit area 612. That is, the movement path of the current moving in the antenna slit 610 may be linked to the resonant length of the antenna structure 50, and thus the resonant length of the antenna structure 50 may be defined based on a connection position of the conductive member 630 in the second slit area 612 with respect to the longitudinal direction D.

Through such a structure, the antenna structure 50 may secure the resonant length of the antenna slit 610 matched to a required frequency using the connection position of the conductive member 630 with respect to the antenna slit 610. For example, a required frequency of the antenna structure 50 may vary according to an environment (e.g., a country, a region, a communication provider, etc.) where the electronic device is used, and the resonant length of the antenna structure 50 may need to be matched to the required frequency and changed accordingly. Changing the connection position of the conductive member 630 with respect to the antenna slit 610 and adjusting the resonant length to be matched to the required frequency, with the length and shape of the antenna slit 610 fixed, may enable the antenna structure 50 to secure a higher degree of general applicability in a process of manufacturing.

FIGS. 7A, 7B, 7C and 7D (which may be referred to as FIGS. 7A through 7D) are diagrams illustrating an example antenna structure with a resonant length changing based on a position of a conductive member in the antenna structure according to various embodiments. FIG. 8 is a graph illustrating a resonance efficiency measured from respective antenna structures illustrated in FIGS. 7A through 7D according to various embodiments.

Referring to FIGS. 7A through 7D and 8, the antenna structure 50 may secure a resonant length of the antenna slit 610 corresponding to various frequencies based on an arrangement position of the conductive member 630 with respect to the antenna slit 610.

The antenna structure 50 may include the antenna slit 610 formed in a longitudinal direction, the feeder 620 disposed in the first slit area 611 of the antenna slit 610, and the conductive member 630 disposed to cover at least a portion of the second slit area 612. A current applied to the antenna slit 610 through the feeder 620 my move along a path formed through a partition wall of the antenna slit 610. When the conductive member 630 is disposed in the second slit area 612, the current applied to the antenna slit 610 may move along the partition wall of the antenna slit 610 along a shortest path that passes via the conductive member 630. In this case, a movement path of the current moving in the antenna slit 610 may determine a resonant length of the antenna structure 50. An inner circumference of an area in the antenna slit 610 in which the current flows may be determined to correspond to a wavelength of a required frequency. For example, a length of the movement path of the current flowing in the antenna slit 610 may be determined to be substantially the same as 1 wavelength of the required frequency or determined to be substantially the same as a wavelength (e.g., ½ wavelength, ¼ wavelength, etc.) obtained by dividing 1 wavelength by an integer.

Figure 7A:
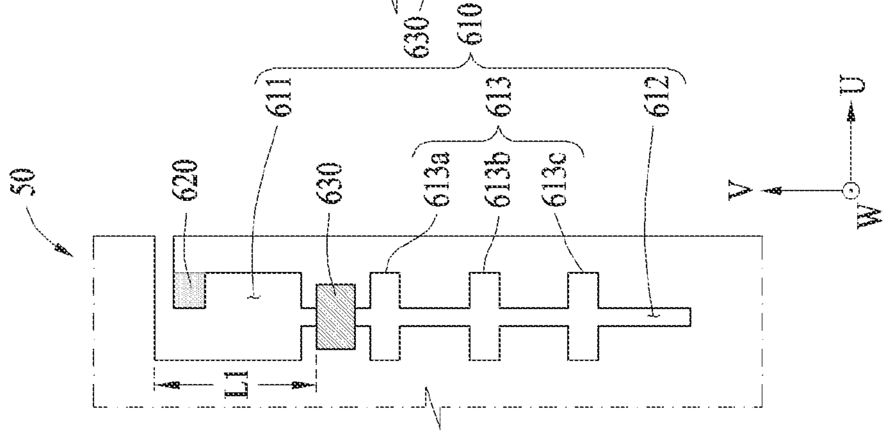
FIGS. 7A, 7B, 7C and 7D are diagrams illustrating an antenna structure with a resonant length changing based on a position of a conductive member in the antenna structure according to various embodiments.
Figure 7B:
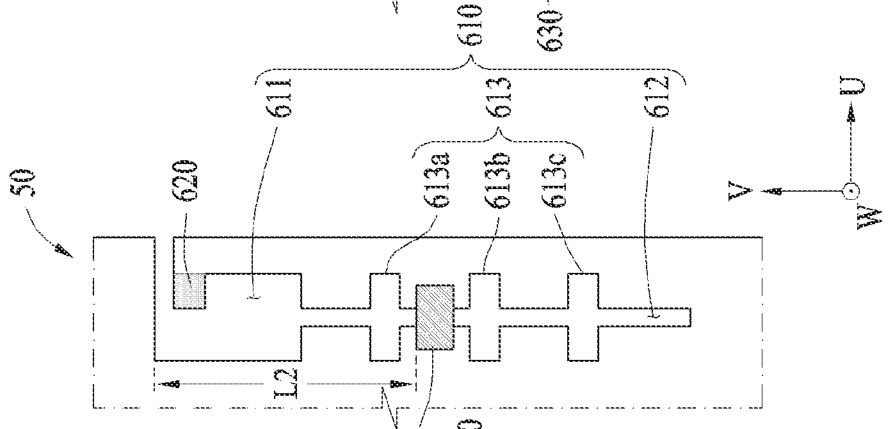
Figure 7C:
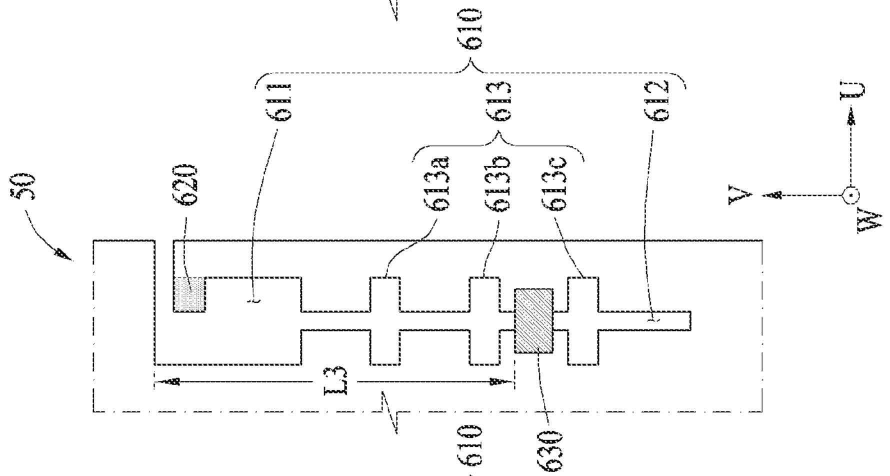
Figure 7D:
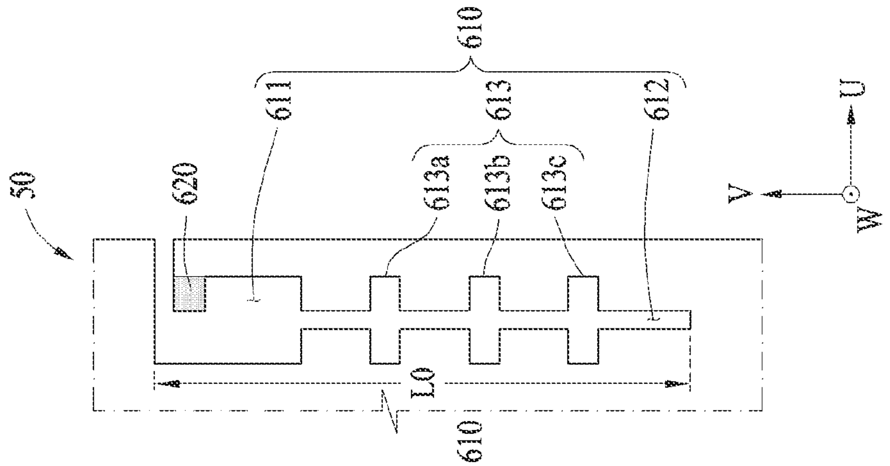
Figure 8:
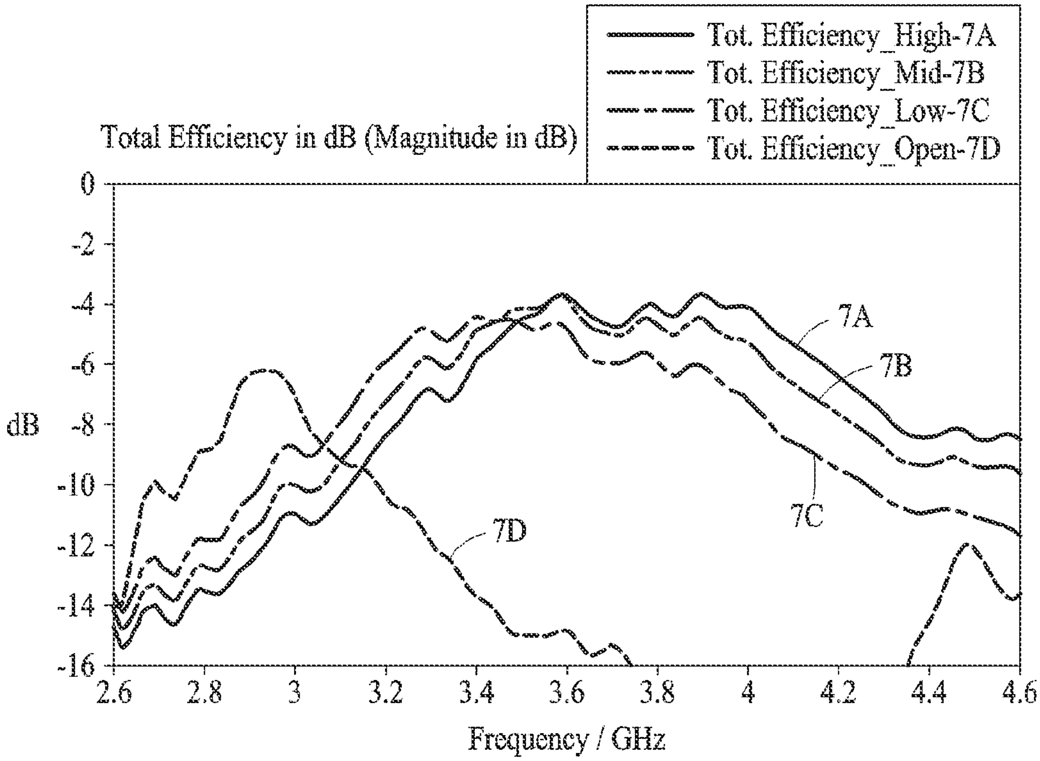
FIG. 8 is a graph illustrating a resonance efficiency measured from respective antenna structures illustrated in FIGS. 7A, 7B, 7C and 7D according to various embodiments.

FIGS. 7A through 7D illustrate examples of a position in the antenna slit 610 to which the conductive member 630 is attached. As illustrated, based on the longitudinal direction of the antenna slit 610, the length of the area of the antenna slit 610 in which the current flows may correspond to a length spanning from an end of the first slit area 611 to a point of the second slit area 612 at which the conductive member 630 is disposed. For example, the length of the area in the antenna slit 610 in which the current flows with respect to the longitudinal direction may correspond to L1 when the conductive member 630 is disposed between the first slit area 611 and the first auxiliary slit 613*a* as illustrated in FIG. 7A, to L2 when the conductive member 630 is disposed between the first auxiliary slit 613*a* and the second auxiliary slit 613*b* as illustrated in FIG. 7B, and to L3 when the conductive member 630 is disposed between the second auxiliary slit 613*b* and the third auxiliary slit 613*c* as illustrated in FIG. 7C. However, when the conductive member 630 is not disposed in the antenna slit 610, the length of the area in which the current applied to the antenna slit 610 flows may correspond to an entire length L0 of the antenna slit 610. The length of the area in the antenna slit 610 in which the current flows, e.g., the length of the movement path of the current, may be inversely proportional to a matching frequency. That is, the longer the length of the movement path along which the current flows in the antenna slit 610, the smaller the corresponding resonant frequency. Thus, the antenna structure 50 illustrated in FIG. 7A may have a resonant length corresponding to a relatively high frequency, the antenna structure 50 illustrated in FIG. 7B may have a resonant length corresponding to a relatively intermediate frequency, and the antenna structure 50 illustrated in FIG. 7C may have a resonant length corresponding to a relatively low frequency.

The resonant frequency of the antenna structure 50 illustrated in FIGS. 7A through 7D may be changed by changing an arrangement position of the conductive member 630 with respect to the antenna slit 610 without antenna matching. As illustrated in a graph of FIG. 8, when the length of the area in which the current flows in the antenna slit 610 in the longitudinal direction decreases as the conductive member 630 is disposed in close proximity of the feeder 620, a matching resonant frequency band may increase. Referring to the graph of FIG. 8, it is verified that, as the arrangement position of the conductive member 630 changes, a stable resonance efficiency and resonant bandwidth may be secured while the resonant frequency changes.

Figure 9B:
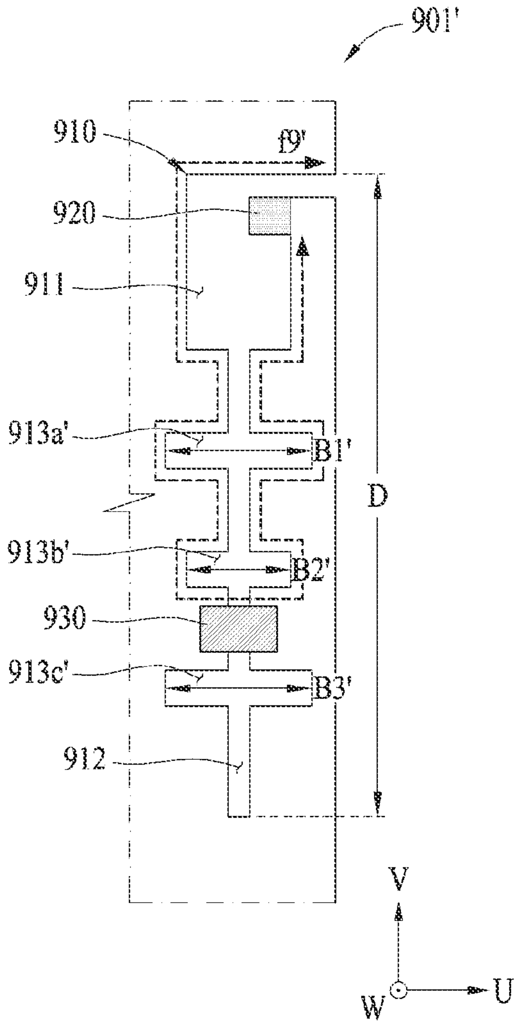

FIGS. 9A and 9B are diagrams illustrating example antenna structures according to various embodiments.

Referring to FIG. 9A, according to an example embodiment, an antenna structure 901 may include an antenna slit 910, a feeder 920, and a conductive member 930.

The antenna slit 910 may include a first slit area 911 in which the feeder 920 is disposed, a second slit area 912 extending from the first slit area 911 in a longitudinal direction D, and a plurality of auxiliary slits formed to be connected to the second slit area 912 in an extending direction vertical to the longitudinal direction D. For example, as illustrated in FIG. 9A, the antenna slit 910 may include a first auxiliary slit 913*a*, a second auxiliary slit 913*b*, and a third auxiliary slit 913*c* that are separate from each other in the longitudinal direction D at the second slit area 912.

At least two of the auxiliary slits 913*a*, 913*b*, and 913*c* may have different lengths in the extending direction (e.g., a U-axis direction in FIG. 9A). For example, as illustrated in FIG. 9A, the second auxiliary slit 913*b* may be formed to have a length B2 in the extending direction, which is relatively shorter than respective lengths B1 and B3 of the first auxiliary slit 913*a* and the third auxiliary slit 913*c* in the extending direction. However, this is provided merely as an example, and the auxiliary slits 913*a*, 913*b*, and 913*c* may be formed to have different lengths in the extending direction, or the second auxiliary slit 913*b* may be formed to have a length in the extending direction that is greater than those of the first auxiliary slit 913*a* and the third auxiliary slit 913*c*.

A length of an auxiliary slit in the extending direction, for example, a length between both ends of the first auxiliary slit 913*a* including the second slit area 912 may be formed to be the same as or similar to a width of the first slit area 911. For example, as illustrated in FIG. 9A, the length B1 between both ends of the first auxiliary slit 913*a* may be the same as or similar to the width of the first slit area 911. However, this is provided merely as an example, and a length of an auxiliary slit in the extending direction is not limited to the foregoing example. For example, a length between both ends of the second auxiliary slit 913*b* may be less than the width of the first slit area 911 as illustrated in FIG. 9A, or a length B1' between both ends of a first auxiliary slit 913*a*' may be greater than the width of the first slit area 911 as illustrated in FIG. 9B.

When a current movement path of the antenna slit 910 that is set through the conductive member 930 includes auxiliary slits 913*a*', 913*b*', and 913*c*', respective lengths B1', B2', and B3' in an extending direction may affect a resonant length of the antenna slit 910. For example, when the conductive member 930 is disposed between the first auxiliary slit 913*a* and the second auxiliary slit 913*b* as illustrated in FIG. 9A, the antenna slit 910 may have a resonant length f9 via the first auxiliary slit 913*a*. In contrast, when the conductive member 930 is disposed between the first auxiliary slit 913*a*' and the second auxiliary slit 913*b*' as illustrated in FIG. 9B, the antenna slit 910 may have a resonant length f9' via the first auxiliary slit 913*a*' and the second auxiliary slit 913*b*'. That is, a length of an auxiliary slit (e.g., 913*a*, 913*b*, and 913*c*) in the extending direction may be included in the resonant length of the antenna slit 910, and a resonant frequency matched to the resonant length may thereby be determined. Thus, through various lengths of an auxiliary slit (e.g., 913*a*, 913*b*, and 913*c*) in the extending direction, an antenna structure (e.g., 901 and 901') may secure resonant lengths matched to various resonant frequencies.

Figure 10:
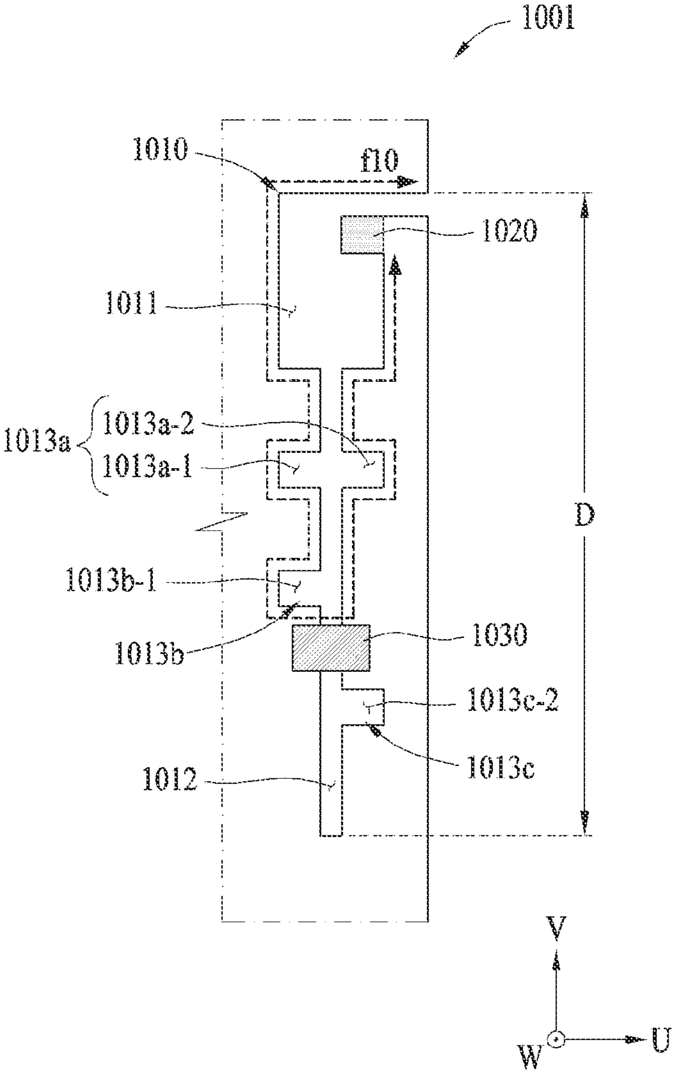
FIG. 10 is a diagram illustrating an example antenna structure according to various embodiments.

FIG. 10 is a diagram illustrating an example antenna structure according to various embodiments.

Referring to FIG. 10, according to an example embodiment, an antenna structure 1001 may include an antenna slit 1010, a feeder 1020, and a conductive member 1030.

The antenna slit 1010 may include a first slit area 1011 in which the feeder 1020 is disposed, a second slit area 1012 extending from the first slit area 1011 in a longitudinal direction D, and a plurality of auxiliary slits 1013*a*, 1013*b*-1, and 1013*c*-2 formed to be connected to the second slit area 1012 in an extending direction vertical to the longitudinal direction D.

A single auxiliary slit, for example, the auxiliary slit 1013*a*, may include a first auxiliary slit area 1013*a*-1 and a second auxiliary slit area 1013*a*-2 respectively formed on both sides of the second slit area 1012 with respect to the longitudinal direction D. For example, the first auxiliary slit area 1013*a*-1 may be formed on a left side (e.g., a −U-axis direction) of the second slit area 1012, and the second auxiliary slit area 1013*a*-2 may be formed on a right side (e.g., a +U-axis direction) of the second slit area 1012.

Each auxiliary slit area (e.g., a first auxiliary slit 1013*a*) may include one of a first auxiliary slit area (e.g., 1013*a*-1 and 1013*b*-1) and a second auxiliary slit area (e.g., 1013*a*-2 and 1013*c*-2). For example, as in the first auxiliary slit 1013*a*, each auxiliary slit may include both the first auxiliary slit area (e.g., 1013*a*-1) and the second auxiliary slit area (e.g., 1013*a*-2). Each auxiliary slit may include only the first auxiliary slit area (e.g., 1013*b*-1) as in the second auxiliary slit 1013*b* or include only the second auxiliary slit area (e.g., 1013*c*-2) as in the third auxiliary slit 1013*c*. For example, when the conductive member 1030 is disposed between the second auxiliary slit 1013*b* and the third auxiliary slit 1013*c* as illustrated in FIG. 10, a current applied to the antenna slit 1010 may have a resonant length f10 that passes via the first auxiliary slit area 1013*a*-1 and the second auxiliary slit area 1013*a*-2 of the first auxiliary slit 1013*a* and the first auxiliary slit area 1013*b*-1 of the second auxiliary slit 1013*b*.

FIG. 11 is a diagram illustrating an example antenna structure according to various embodiments.

Referring to FIG. 11, according to an example embodiment, an antenna structure 1101 may include an antenna slit 1110, a feeder 1120, and a conductive member 1130.

The antenna slit 1110 may include a first slit area 1111 in which the feeder 1120 is disposed, a second slit area 1112 extending from the first slit area 1111 in a longitudinal direction D, and a plurality of auxiliary slits 1113*a*, 1113*b*, and 1113*c* formed to be connected to the second slit area 1112 in an extending direction vertical to the longitudinal direction D. The auxiliary slits 1113*a*, 1113*b*, and 1113*c* may include first auxiliary slit areas 1113*a*-1, 1113*b*-1, and 1113*c*-1 and second auxiliary slit areas 1113*a*-2, 1113*b*-2, and 1113*c*-2, respectively.

For each auxiliary slit (e.g., 1113*a*, 1113*b*, and 1113*c*), a first auxiliary slit area (e.g., 1113*a*-1, 1113*b*-1, and 1113*c*-1) and a second auxiliary slit area (e.g., 1113*a*-2, 1113*b*-2, and 1113*c*-2) may have substantially the same length or different lengths in the extending direction. For example, a length of the first auxiliary slit area 1113*a*-1 may be longer than a length of the second auxiliary slit area 1113*a*-2 (for the first auxiliary slit 1113*a* of FIG. 11), a length of the first auxiliary slit area 1113*b*-1 may be shorter than a length of the second auxiliary slit area 1113*b*-2 (for the second auxiliary slit 1113*b* of FIG. 11), or a length of the first auxiliary slit area 1113*c*-1 may be equal to a length of the second auxiliary slit area 1113*c*-2 (for the third auxiliary slit 1113*c* of FIG. 11). When the conductive member 1130 is disposed between the second auxiliary slit 1113*b* and the third auxiliary slit 1113*c* as illustrated in FIG. 11, a current applied to the antenna slit 1110 may have a resonant length f11 that passes via both auxiliary slit areas 1113*a*-1, 1113*a*-2, 1113*b*-1, and 1113*b*-2 of the first auxiliary slit 1113*a* and the second auxiliary slit 113*b*.

Figure 12:
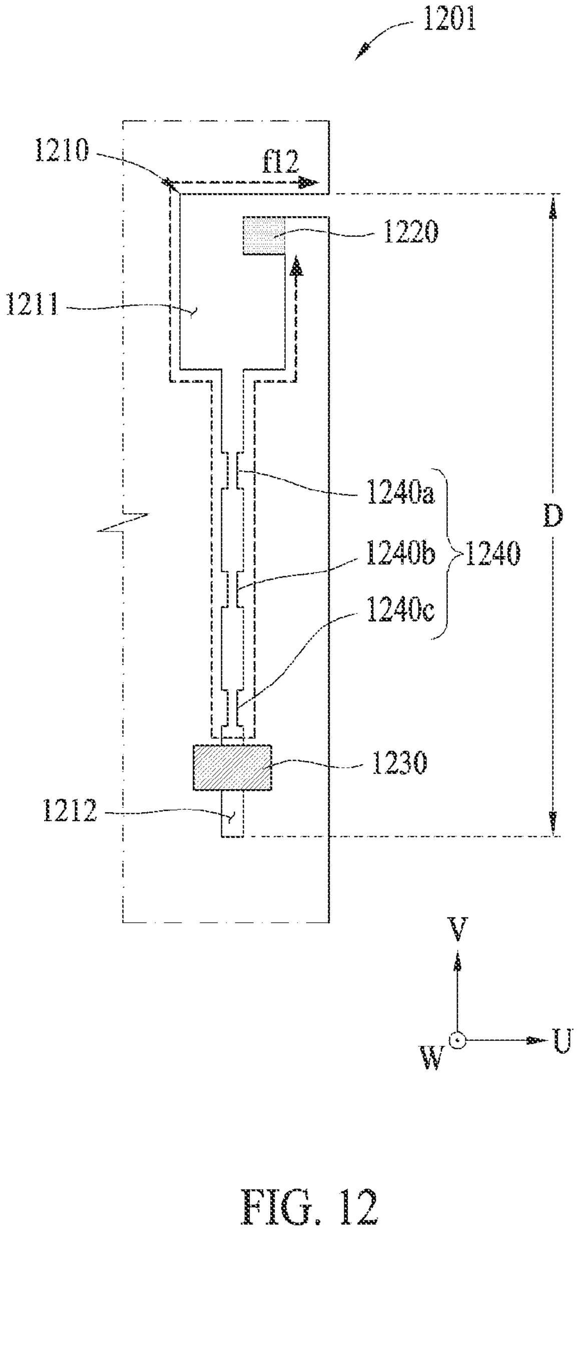
FIG. 12 is a diagram illustrating an example antenna structure according to various embodiments.

FIG. 12 is a diagram illustrating an example antenna structure according to various embodiments.

Referring to FIG. 12, according to an example embodiment, an antenna structure 1201 may include an antenna slit 1210, a feeder 1220, and a conductive member 1230.

The antenna slit 1210 may include a first slit area 1211 in which the feeder 1220 is disposed, a second slit area 1212 extending from the first slit area 1211 in a longitudinal direction D, and a flange 1240 protruding in a width-centric direction of the second slit area 1212 along an extending direction vertical to the longitudinal direction D.

For example, the antenna slit 1210 may include a plurality of flanges 1240*a*, 1240*b*, and 1240*c* formed to be separate from each other along the longitudinal direction D of the second slit area 1212. Respective lengths of the flanges 1240*a*, 1240*b*, and 1240*c* protruding inward in the second slit area 1212 may be substantially the same or different. A single flange 1240 may protrude from both sides of the second slit area 1212 as illustrated in FIG. 12, or protrude only from a left side (e.g., a −U-axis direction) of the second slit area 1212 or protrude only from a right side (e.g., a +U-axis direction) of the second slit area 1212. The flange 1240 may perform a function as connecting coordinates of the conductive member 1230 with respect to the second slit area 1212. A position at which the flange 1240 is formed in the second slit area 1212 may be determined based on a plurality of resonant lengths determined based an arrangement position of the conductive member 1230. For example, when the antenna slit 1210 includes a first flange 1240*a*, a second flange 1240*b*, and a third flange 1240*c* as illustrated in FIG. 12, an operator may predict a resonant length of the antenna slit 1210 based on an arrangement position of the conductive member 1230 through each flange during a process of connecting the conductive member 12130 to the second slit area 1212. In this example, when the conductive member 1230 is disposed between the third flange 1240*c* and an end of the second slit area 1212, the operator may predict that the antenna slit 1210 corresponds to a predesigned resonant length f12.

Figure 13:
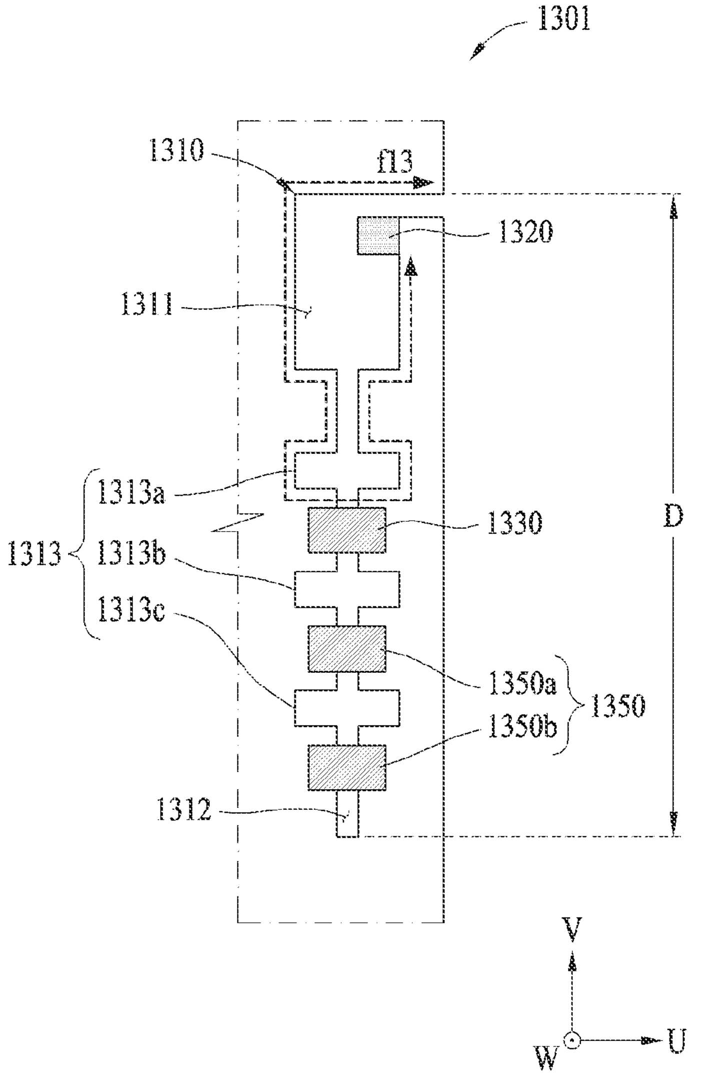
FIG. 13 is a diagram illustrating an example antenna structure according to various embodiments.

FIG. 13 is a diagram illustrating an example antenna structure according to various embodiments.

Referring to FIG. 13, according to an example embodiment, an antenna structure 1301 may include an antenna slit 1310, a feeder 1320, a conductive member 1330, and a shielding member 1350.

The antenna slit 1310 may include a first slit area 1311 in which the feeder 1320 is disposed, a second slit area 1312 extending from the first slit area 1311 in a longitudinal direction D, and a plurality of auxiliary slits 1313 formed to be connected to the second slit area 1312 in an extending direction (e.g., a U-axis direction in FIG. 13) vertical to the longitudinal direction D. The conductive member 1330 may be disposed in the second slit area 1312 and define a resonant length f13 of the antenna slit 1310.

The shielding member 1350 may be disposed to cover at least a portion of the second slit area 1312, and block a current leakage in a remaining area excluding a resonant area of the antenna slit 1310 defined by the conductive member 1330. The shielding member 1350 may be formed of a shielding material (e.g., non-conductive material such as a polymer, or a ferromagnetic body). An arrangement position of the shielding member 1350 in the second slit area 1312 may be opposite to the first slit area 1311 with respect to the conductive member 1330. In this case, the shielding member 1350 may be provided as a plurality of shielding members 1350*a* and 1350*b* to prevent and/or reduce a current leakage at a plurality of points in the second slit area 1312. For example, when the conductive member 1330 is disposed between a first auxiliary slit 1313*a* and a second auxiliary slit 1313*b*, the resonant area in which a current applied to the antenna slit 1310 moves may be defined from the first slit area 1311 to the second slit area 1312 in which the first auxiliary slit 1313*a* is formed. In this example, the shielding member 1350 may include a first shielding member 1350*a* disposed between the second auxiliary slit 1313*b* and a third auxiliary slit 1313*c*, and a second shielding member 1350*b* disposed between the third auxiliary slit 1313*c* and the end of the second slit area 1312. Thus, the shielding member 1350 may prevent and/or reduce a radiation efficiency of the antenna structure 1301 from being reduced due to a current leaked to the second slit area 1312 excluding the resonant area.

Figure 14:
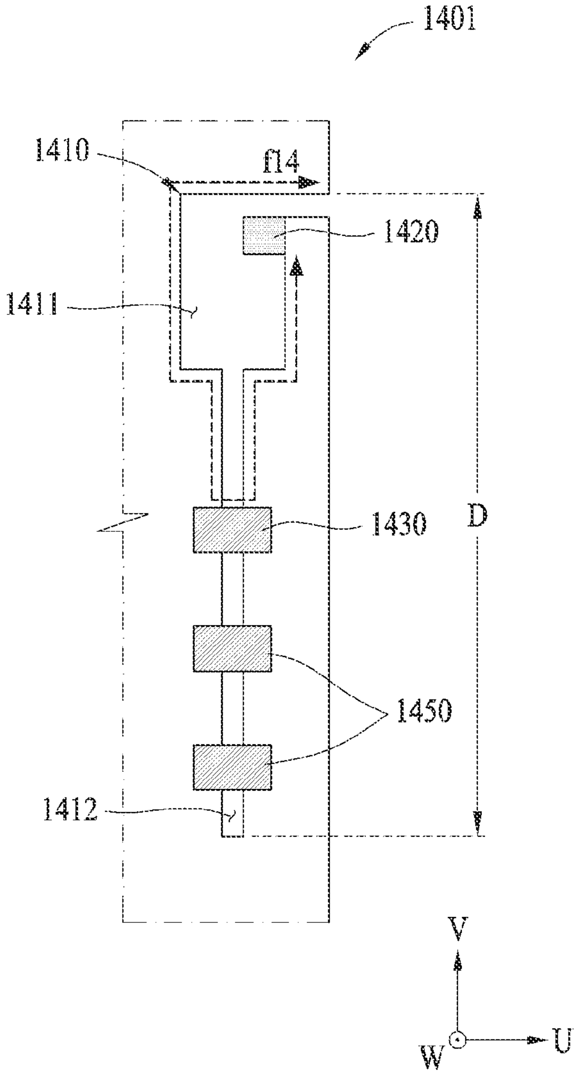
FIG. 14 is a diagram illustrating an example antenna structure according to various embodiments.

FIG. 14 is a diagram illustrating an example antenna structure according to various embodiments.

Referring to FIG. 14, according to an example embodiment, an antenna structure 1401 may include an antenna slit 1410, a feeder 1420, a conductive member 1430, and a shielding member 1450.

The antenna slit 1410 may include a first slit area 1411 in which the feeder 1420 is disposed, and a second slit area 1412 extending from the first slit area 1411 in a longitudinal direction D. The conductive member 1430 may be disposed in the second slit area 1412 and define a resonant length f14 of the antenna slit 1410.

The shielding member 1450 may be disposed in an area of the second slit area 1412 opposite to the first slit area 1411, with respect to the conductive member 1430. The shielding member 1450 may block a current leakage in a remaining area excluding a resonant area of the antenna slit 1410 defined by the conductive member 1430.

Figure 15:
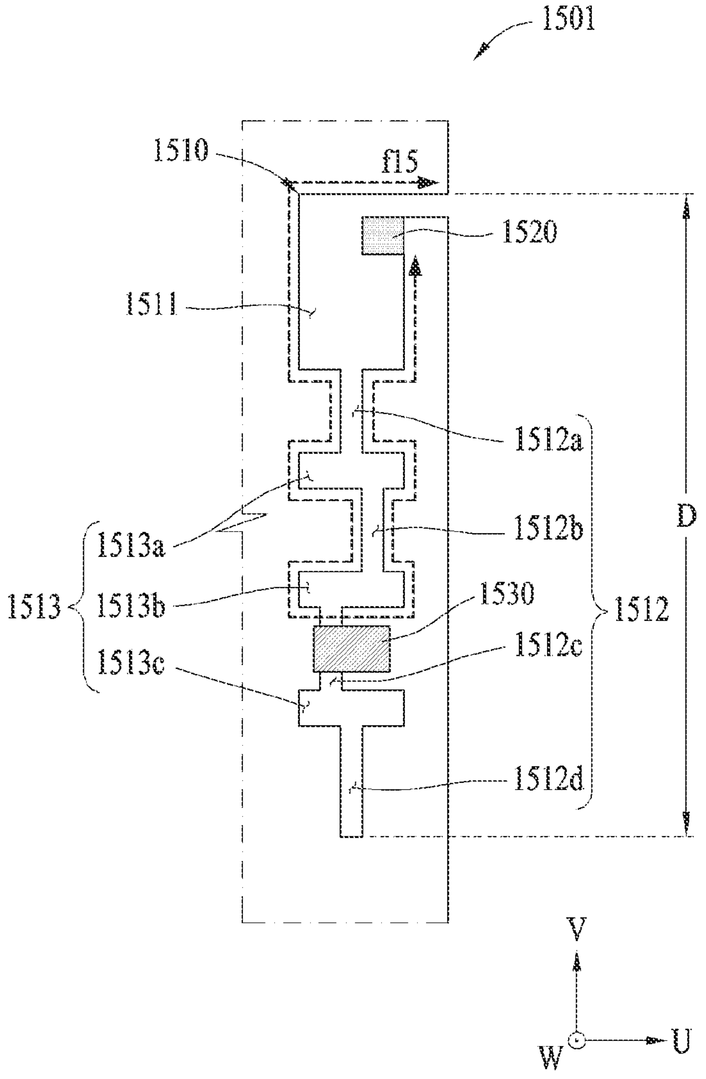
FIG. 15 is a diagram illustrating an example antenna structure according to an various embodiments.

FIG. 15 is a diagram illustrating an example antenna structure according to various embodiments.

Referring to FIG. 15, according to an example embodiment, an antenna structure 1501 may include an antenna slit 1510, a feeder 1520, and a conductive member 1530 configured to define a resonant length f15 of the antenna slit 1510.

The antenna slit 1510 may include a first slit area 1511 in which the feeder 1520 is disposed, a second slit area 1512 extending from the first slit area 1511 in a longitudinal direction D, and a plurality of auxiliary slits 1513 formed to be connected to the second slit area 1512 in an extending direction vertical to the longitudinal direction D.

The first slit area 1511 and the second slit area 1512 may have different widths. In this case, the first slit area 1511 and the second slit area 1512 may have the same central axis or different central axes that are parallel to the longitudinal direction D and pass a center of a width.

The auxiliary slits 1513 may divide the second slit area 1512 into a plurality of areas 1512*a*, 1512*b*, 1512*c*, and 1512*d* in the longitudinal direction D. In this case, the areas 1512*a*, 1512*b*, 1512*c*, and 1512*d* of the second slit area 1512 divided by the auxiliary slits 1513 may have different central axes that are parallel to the longitudinal direction D and pass a center of a width. That is, a central axis passing a center of a width of the second slit area 1512 may have a position that changes with respect to each auxiliary slit 1513. For example, when the antenna slit 1510 includes a first auxiliary slit 1513*a*, a second auxiliary slit 1513*b*, and a third auxiliary slit 1513*a*, the second slit area 1512 may include 2-1 slit area 1512*a* disposed between the first slit area 1511 and the first auxiliary slit 1513*a,* 2-2 slit area 1512*b* disposed between the first auxiliary slit 1513*a* and the second auxiliary slit 1513*b,* 2-3 slit area 1512*c* disposed between the second auxiliary slit 1513*b* and the third auxiliary slit 1513*c*, and 2-4 slit area 1512*d* extending from the third auxiliary slit 1513*c* in the longitudinal direction D. In this example, the areas 1512*a*, 1512*b*, 1512*c*, and 1512*d* of the second slit area 1512 divided by the auxiliary slits 1513 may have different central axes vertical to the longitudinal direction D and passing through a center of a width. For example, a central axis of 2-1 auxiliary slit area 1512*a* may be the same as or similar to a central axis of the first slit area 1511, and central axes of 2-2 auxiliary slit area 1512*b* and 2-3 auxiliary slit area 1512*c* may be separate from the central axis of the first slit area 1511.

Figure 16:
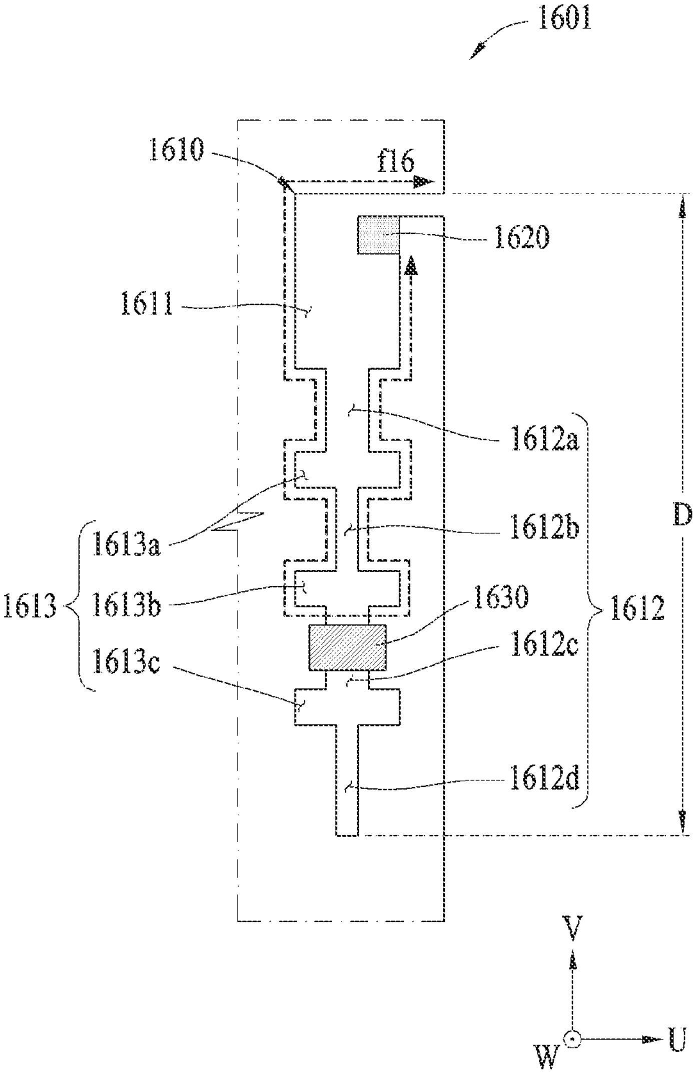
FIG. 16 is a diagram illustrating an example antenna structure according to various embodiments.

FIG. 16 is a diagram illustrating an example antenna structure according to various embodiments.

Referring to FIG. 16, according to an example embodiment, an antenna structure 1601 may include an antenna slit 1610, a feeder 1620, and a conductive member 1630 configured to define a resonant length f16 of the antenna slit 1610.

The antenna slit 1610 may include a first slit area 1611 in which the feeder 1620 is disposed, a second slit area 1612 extending from the first slit area 1611 in a longitudinal direction D, and a plurality of auxiliary slits 1613 formed to be connected to the second slit area 1612 in an extending direction vertical to the longitudinal direction D.

The second slit area 1612 may be formed to have a relatively smaller width than the first slit area 1611. In this case, the second slit area 1612 may be formed to have a width that varies along the longitudinal direction D. For example, the second slit area 1612 may be divided into a plurality of areas 1612*a*, 1612*b*, 1612*c*, and 1612*d* based on boundaries respectively corresponding to a plurality of auxiliary slits 1613*a*, 1613*b*, and 1613*c*, and the areas 1612*a*, 1612*b*, 1612*c*, and 1612*d* may have different widths.

Figure 17:
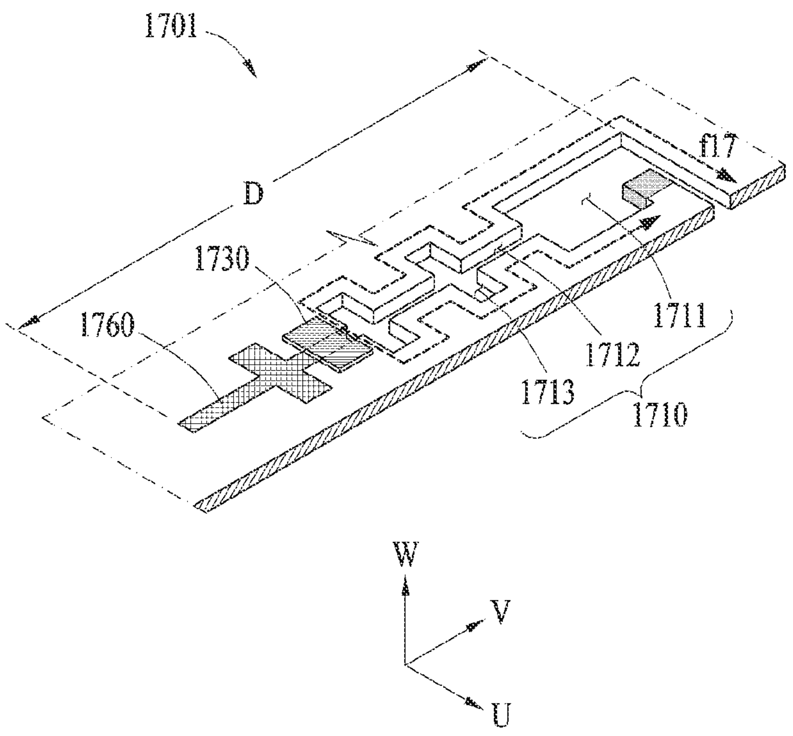
FIG. 17 is a perspective view of an example antenna structure according to various embodiments.

FIG. 17 is a perspective view of an example antenna structure according to various embodiments.

Referring to FIG. 17, an antenna structure 1701 may include an antenna slit 1710, a feeder, and a dielectric 1760.

The antenna slit 1710 may include a first slit area 1711 in which the feeder is disposed, a second slit area 1712 extending from the first slit area 1711 in a longitudinal direction D, and a plurality of auxiliary slits 1713 formed to be connected to the second slit area 1712 in an extending direction vertical to the longitudinal direction D. Based on a width vertical to the longitudinal direction D, the first slit area 1711 may have a first width and the second slit area 1712 may have a second width less than the first width.

The dielectric 1760 may be filled (or disposed) in at least a portion of the antenna slit 1710. For example, the dielectric 1760 may be filled (or disposed) in the entire portion of the first slit area 1711 and the second slit area 1712. The dielectric 1760 may be filled (or disposed) in only at least a portion of the second slit area 1712 as illustrated in FIG. 17. The dielectric 1760 may have its own permittivity, and may thus change a resonant frequency based on a flow of a current applied to the antenna slit 1710. Thus, a target frequency to be implemented through the antenna structure 1701 may be set through adjustments of a filling degree and a filling position of the dielectric 1760 with respect to the antenna slit 1710.

The antenna structure 1701 may include a conductive member 1730 disposed to cover at least a portion of the second slit area 1712. In this case, a current applied to the antenna slit 1710 may flow along a resonant path f17 from the first slit area 1711 via the second slit area 1712 in which the conductive member 1730 is disposed. In this case, the conductive member 1730 may be disposed to overlap the second slit area 1712 in which the dielectric 1760 is disposed, based on a W-axis direction in FIG. 17.

According to an example embodiment, an electronic device (e.g., 301) may include: a housing (e.g., 310) including a front surface (e.g., 310*a*), a rear surface (e.g., 310*b*) opposite to the front surface, and a side surface (e.g., 311) surrounding at least a portion of an internal space between the front surface and the rear surface, of which at least a portion is formed of a conductive material, a wireless communication circuit (e.g., 192) disposed in the internal space; and an antenna structure (e.g., 50) including an antenna electrically connected to the wireless communication circuit. The antenna structure may include: an antenna slit (e.g., 610) formed in an area of the side surface formed of the conductive material; a feeder (e.g., 620) configured to apply a current to the antenna slit, and a conductive member comprising a conductive material (e.g., 630) connected to the side surface to cover at least a portion of the antenna slit. The antenna slit may include: a first slit area (e.g., 611) in which the feeder is disposed and a second slit area (e.g., 612) extending from the first slit area in a longitudinal direction and having a width different from that of the first slit area, and a resonant length of the antenna slit may be defined based on an arrangement position of the conductive member in (or with respect to) the second slit area.

The first slit area may have a first width vertical to the longitudinal direction, and the second slit area may have a second width vertical to the longitudinal direction and narrower than the first width.

The antenna slit may further include an auxiliary slit (e.g., 613) formed in an extending direction vertical to the longitudinal direction and communicating with the second slit area.

The auxiliary slit may comprise a plurality of auxiliary slits (e.g., 613*a*, 613*b*, and 613*c*) formed to be separate from each other in the longitudinal direction D of the second slit area.

At least two of the auxiliary slits may have different lengths in the extending direction of the auxiliary slits.

Respective lengths of the auxiliary slits in the extending direction may be substantially the same.

The auxiliary slit may include a first auxiliary slit area (e.g., 6131) and a second auxiliary slit area (e.g., 6132) respectively formed in both directions of the second slit area vertical to the longitudinal direction.

A length of the first auxiliary slit area extending from the second slit area and a length of the second auxiliary slit area extending from the second slit area may be substantially the same.

The lengths of the first auxiliary slit area and the second auxiliary slit area extending from the second slit area may be different from each other.

The antenna slit (e.g., 1210) may further include a flange portion (e.g., 1240) vertical to the longitudinal direction and protruding in a width-centric direction of the second slit area (e.g., 1212).

The antenna structure (e.g., 1301) may further include a shielding member (e.g., 1350) comprising a shielding material disposed to cover at least a portion of the second slit area (e.g., 1312), and a position of the shielding member in (or with respect to) the second slit area may be opposite to the first slit area (e.g., 1311) with respect to the conductive member (e.g., 1330).

The antenna slit (e.g., 1510) may further include at least one auxiliary slit (e.g., 1513) extending in a direction vertical to the longitudinal direction of the second slit area (e.g., 1512), and a central axis of the second slit area parallel to the longitudinal direction and passing a center of a width may change with respect to the auxiliary slit.

Respective central axes of the first slit area (e.g., 1511) and the second slit area (e.g., 1512) parallel to the longitudinal direction and passing through a center of a width may be different from each other.

At least a portion of the first slit area may be open to an outside of the electronic device.

The antenna slit (e.g., 1710) may further include a dielectric (e.g., 1760) disposed in the second slit area (e.g., 1712) extending in a direction opposite to the first slit area (e.g., 1711) from an area in which the conductive member (e.g., 1730) is disposed.

According to an example embodiment, an electronic device (e.g., 301) may include: a wireless communication circuit (e.g., 192) disposed inside the electronic device; a side portion (e.g., 340) disposed in at least a portion of a side surface (e.g., 311) of the electronic device and comprising a conductive material; and an antenna structure (e.g., 1701) comprising an antenna formed in the side portion and electrically connected to the wireless communication circuit. The antenna structure may include: an antenna slit (e.g., 1710) including a first slit area (e.g., 1711) formed in the side portion having a longitudinal direction and having a first width vertical to the longitudinal direction and a second slit area (e.g., 1712) extending from the first slit area in the longitudinal direction and having a second width different from the first width; a feeder (e.g., 1720) disposed in the first slit area; a dielectric (e.g., 1760) disposed in at least a portion of the antenna slit; and a conductive member comprising a conductive material (e.g., 1730) disposed to cross the second slit area in a width direction. A resonant length of the antenna slit may be defined by a length from the first slit area to the second slit area in which the conductive member is disposed.

The antenna slit may further include at least one auxiliary slit (e.g., 1713) extending in an extending direction vertical to the longitudinal direction from the second slit area.

The auxiliary slit may be comprise a plurality of auxiliary slits separate from each other in the longitudinal direction of the second slit area, and the auxiliary slits may have substantially the same length or different lengths in the extending direction.

Based on the longitudinal direction extending from the first slit area to the second slit area, the dielectric may be disposed from the second slit area in which the dielectric is initially disposed to an end of the second slit area opposite to the first slit area.

The dielectric may be disposed in the second slit area, and the conductive member may be disposed in the side portion to cover the second slit area in which the dielectric is filled.

While the disclosure has been illustrated and described with reference to various example embodiments, it will be understood that the various example embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:

a housing comprising a front surface, a rear surface opposite to the front surface, and a side surface surrounding at least a portion of an internal space between the front surface and the rear surface, the side surface comprising a conductive material;

a wireless communication circuit disposed in the internal space; and an antenna structure including an antenna electrically connected to the wireless communication circuit, wherein the antenna structure comprises:

an antenna slit formed in an area of the side surface comprising the conductive material and having a longitudinal direction;

a feeder configured to apply a current to the antenna slit;

a conductive member comprising a conductive material connected to the side surface to cover at least a portion of the antenna slit, wherein the antenna slit comprises:

a first slit area in which the feeder is disposed and at least a portion of the first slit area is open to an outside of the electronic device, wherein the first slit area has a first width vertical to the longitudinal direction;

a second slit area extending from the first slit area in the longitudinal direction and having a width different from that of the first slit area, wherein the second slit area has a second width vertical to the longitudinal direction and the second width narrower than the first width;

a plurality of auxiliary slits formed in an extending direction vertical to the longitudinal direction and communicating with the second slit area, wherein the plurality of auxiliary slits comprises a first auxiliary slit, a second auxiliary slit and a third auxiliary slit formed to be separate from each other and formed along a longitudinal direction of the second slit area from the first slit area, wherein the conductive member is disposed to cross the width direction of the second slit area within the second slit area, and the conductive member is disposed only at one of the positions between the first slit area and the first auxiliary slit, or between the first auxiliary slit and the second auxiliary slit, or between the second auxiliary slit and the third auxiliary slit, and a resonance of the antenna slit changes based on an arrangement position of the conductive member with respect to the second slit area;

wherein a dielectric is disposed in the second slit area extending in a direction opposite to the first slit area from the position in which the conductive member is disposed.

2. The electronic device of claim 1, wherein at least two of the auxiliary slits have different lengths in the extending direction.

3. The electronic device of claim 1, wherein the auxiliary slits have substantially a same length in the extending direction.

4. The electronic device of claim 1, wherein the auxiliary slit comprises a first auxiliary slit area and a second auxiliary slit area respectively formed in both directions of the second slit area vertical to the longitudinal direction.

5. The electronic device of claim 4, wherein a length of the first auxiliary slit area extending from the second slit area and a length of the second auxiliary slit area extending from the second slit area are substantially the same.

6. The electronic device of claim 4, wherein a length of the first auxiliary slit area extending from the second slit area and a length of the second auxiliary slit area extending from the second slit area are different lengths extending from the second slit area.

7. The electronic device of claim 1, further comprising:

a shielding member comprising a shielding material disposed to cover at least a portion of the second slit area, wherein a position of the shielding member with respect to the second slit area is opposite to the first slit area with respect to the conductive member.

8. The electronic device of claim 1, wherein the antenna slit further comprises:

at least one auxiliary slit extending in a direction vertical to a longitudinal direction of the second slit area, wherein a central axis of the second slit area parallel to the longitudinal direction and passing through a center of a width changes with respect to the auxiliary slit.

9. The electronic device of claim 1, wherein the first slit area and the second slit area are different in a central axis parallel to the longitudinal direction and passing through a center of a width.

* * * * *